(12) United States Patent
Koga et al.

(10) Patent No.: US 8,040,235 B2
(45) Date of Patent: Oct. 18, 2011

(54) RELAY APPARATUS AND ELECTRIC APPLIANCE

(75) Inventors: Hisao Koga, Fukuoka (JP); Yuji Igata, Fukuoka (JP); Ryota Yukizane, Fukuoka (JP); Fumio Ichihara, Fukuoka (JP); Mutsuhiko Oishi, Fukuoka (JP)

(73) Assignee: Panasonic Corporation, Osaka (JP)

( * ) Notice: Subject to any disclaimer, the term of this patent is extended or adjusted under 35 U.S.C. 154(b) by 832 days.

(21) Appl. No.: 11/398,704

(22) Filed: Apr. 6, 2006

(65) Prior Publication Data

US 2006/0227884 A1 Oct. 12, 2006

(30) Foreign Application Priority Data

Apr. 8, 2005 (JP) ................................. 2005-112249
Sep. 15, 2005 (JP) ................................. 2005-268049

(51) Int. Cl.
*H04Q 1/30* (2006.01)
*G08B 23/00* (2006.01)
*H04B 3/00* (2006.01)
*H01R 25/00* (2006.01)
*H04J 3/12* (2006.01)
*H04N 7/16* (2011.01)

(52) U.S. Cl. .................. 340/538; 340/870.02; 375/257; 439/638; 370/524; 725/1

(58) Field of Classification Search .................. 340/538; 375/257; 307/1
See application file for complete search history.

(56) References Cited

U.S. PATENT DOCUMENTS

| | | | | |
|---|---|---|---|---|
| 4,686,382 A | * | 8/1987 | Shuey | 307/149 |
| 5,664,002 A | * | 9/1997 | Skinner, Sr. | 379/56.2 |
| 5,805,053 A | * | 9/1998 | Patel et al. | 340/310.11 |
| 6,177,849 B1 | * | 1/2001 | Barsellotti et al. | 333/177 |
| 6,747,859 B2 | * | 6/2004 | Walbeck et al. | 361/93.1 |
| 7,456,516 B2 | * | 11/2008 | Suzuki | 307/3 |
| 2002/0031217 A1 | * | 3/2002 | Kiykioglu | 379/399.01 |
| 2002/0090010 A1 | * | 7/2002 | Bader | 370/524 |
| 2002/0157115 A1 | * | 10/2002 | Lu | 725/131 |

(Continued)

FOREIGN PATENT DOCUMENTS

JP 60-149243 8/1985

(Continued)

OTHER PUBLICATIONS

Japanese Office Action dated Jun. 8, 2010 with partial English translation.

(Continued)

*Primary Examiner* — George Bugg
*Assistant Examiner* — Jack Wang
(74) *Attorney, Agent, or Firm* — Dickinson Wright PLLC

(57) ABSTRACT

A relay apparatus includes a plurality of connecting terminals, such as a modem connecting terminal, a power line connecting terminal, an electric appliance connecting terminal and an antenna line connecting terminal; a selector that selects at least one connecting terminal from among the plurality of connecting terminals to transmit and receive a communication signal; and a control circuit that controls the selector. The relay apparatus further includes a first communication filter that passes signals in a frequency band used for communication by a power line communication modem and that blocks signals in other frequency bands, and a second communication filter that passes signals in a frequency band used for communication by another electric appliance and that blocks signals in other frequency bands.

6 Claims, 22 Drawing Sheets

U.S. PATENT DOCUMENTS

| | | | |
|---|---|---|---|
| 2002/0174423 A1* | 11/2002 | Fifield et al. | 725/1 |
| 2004/0087214 A1* | 5/2004 | Cho | 439/638 |
| 2005/0002142 A1* | 1/2005 | Chueh et al. | 361/91.1 |

FOREIGN PATENT DOCUMENTS

| | | |
|---|---|---|
| JP | 61-028267 | 2/1986 |
| JP | 10-257002 | 9/1998 |
| JP | 2000165304 | 6/2000 |
| JP | 2002-77000 | 3/2002 |
| JP | 2002077000 | 3/2002 |
| JP | 2002373389 | 12/2002 |
| JP | 2004015455 | 1/2004 |
| JP | 2005-64750 | 3/2005 |

OTHER PUBLICATIONS

Japanese Office Action dated Sep. 14, 2010 with partial English translation.

Japanese Office Action dated Nov. 2, 2010 with partial English translation.

* cited by examiner

LPF

HPF

BPF

COMMUNICATION SIGNAL TRANSMITTED
FROM A PLC APPARATUS

PARTIALLY OVERLAPPING

BAND LIMIT OF A

BAND LIMIT OF B

BAND LIMIT OF A AND B

CHANGE BAND DIVISION RATIO

RELAY APPARATUS AND ELECTRIC APPLIANCE

BACKGROUND

1. Field of the Invention

The present invention relates to a relay apparatus that is connected to a wire transmission line and a communication apparatus so as to relay communication signals, in a system that performs wire communications, including power line communications using, for example, a home-use power line as a transmission line.

2. Description of Related Art

When using a terminal such as a computer for wire data communications at homes, offices, factories and the like, it is usually necessary to install wires such as cables and terminals to be used as transmission lines at such locations where they are needed. This requires a large scale of installation work before the communication system goes into operation.

However, at homes, offices and factories, commercial power supply, for example, 100V AC-50/60 Hz in Japan, 120V AC-60 Hz in the United States of America is generally used. Therefore, power lines (electric lamp lines) for supplying such power are already installed everywhere within homes, offices and factories. Utilizing these power lines for data communications thus eliminates the need to newly install exclusive wires for communications. More specifically, by simply plugging a communication apparatus into a power outlet, a communication line can be secured.

PLC (Power Line Communication) technology using such power lines for communications is disclosed, for example, in Japanese Laid Open Publication 2000-165304. Currently, various domestic and foreign manufactures are pursuing research and development projects focused on predetermined frequency bands (e.g., 2 MHz-30 MHz in Japan, 1.705-30 MHz in the United States of America). More specifically, cases are envisioned wherein a method such as OFDM (Orthogonal Frequency Division Multiplexing) is used to generate a multicarrier signal using a plurality of subcarriers in order to transmit the multicarrier signal via a power line.

However, indoor power line wiring is very complicated and each building has significantly different conditions. Moreover, since wide-ranging types of electric appliances are connected to such power lines, various noises can occur and induce impedance fluctuations. Therefore, compared to when performing communications via an exclusive wire transmission line, when performing communications via a power line, there is a higher possibility that communication speed slows down considerably or communication quality deteriorates due to decrease in a S/N ratio (signal-to-noise ratio).

In other words, while power line communications are very convenient in that their transmission lines can be easily secured, there are cases in which sufficient communication speed or desirable communication quality cannot be achieved in an environment where various users perform power line communications.

For instance, when an exclusive transmission line is available for supplementary use to substitute a power line, it becomes possible to meet the needs of users who cannot obtain desirable communication speed and quality in power line communications. However, when newly preparing an exclusive wire transmission line, users face situations where wire installation work becomes necessary or where newly installed wires are left exposed in the room. This ruins the benefit of convenience afforded by power line communications.

Mostly, wiring of, such as, for example, a coaxial line that connects a TV antenna and a TV receiver and a telephone line that connects a telephone is normally installed in a standard home. Since exclusive outlets are installed for such wiring, connecting and disconnecting apparatuses is very easy. Therefore, for those who cannot enjoy desirable communication speed and quality in power line communications, existing wiring other than power lines, i.e., coaxial lines for TV antennas and telephone lines, may be utilized as transmission lines.

However, when connecting different electric appliances to the same wiring, an impedance mismatching inevitably occurs and causes problems, since such connection configuration is not standardized. For instance, when connecting a PLC modem to a coaxial line that connects a TV antenna and a TV receiver, the impedance of the modem causes an impedance mismatching on a line between the TV antenna and the TV receiver. As a result, reflections generated in reception signals and other factors deteriorate a S/N ratio for reception signals to be input into the TV receiver. At the same time, due to the influence of the impedance of the TV receiver or the like, an impedance mismatching occurs on the lines between a plurality of modems connected to the coaxial line. As a result, reflections generated in reception signals and other factors deteriorate a S/N ratio, resulting in low communication quality. In addition, signals different from those transmitted by respective electric appliances are received merely as noise. Therefore, when a plurality of different electric appliances shares the same transmission line, the S/N ratio of communication signals deteriorates due to the influence of signals transmitted from other electric appliances or modems. The same results obtain when a telephone line is used as the common transmission line.

As described above, when performing power line communications by connecting a PLC apparatus to existing wire transmission lines other than a power line, such as an antenna line and a telephone line, to utilize these wire transmission lines, there are cases where an impedance mismatching occurs, thereby causing problems, in communications to be performed via these wire transmission lines as well as communications through power line communications, such as lower communication quality. For instance, while a TV receiver connected to an antenna line is receiving a broadcast, TV reception quality may deteriorate due to signal reflections and the like. TV reception signals can also become noise at a PLC apparatus, resulting in lower communication quality.

SUMMARY

Some embodiments described hereinafter are provided to address the above-described problems. A purpose of these embodiments is to provide a relay apparatus that is capable of improving quality of power line communications by utilizing predetermined lines other than a power line as transmission lines, and of maintaining high communication quality for individual communication apparatuses even when a plurality of different types of communication apparatuses and electric appliances are connected to a common line.

A relay apparatus comprising: a first terminal that is capable to connect a first wire transmission line; a second terminal that is capable to connect a power line; a third terminal that is capable to connect a second wire transmission line; a coupler that is provided between the first terminal and the second terminal, and that transmits power line communication signals between the first terminal and the second terminal; a first filter that is provided between the first terminal and the second terminal; and a second filter that is provided between the first terminal and the third terminal, wherein the power line communication signals transmit between the first terminal and the second terminal through the first filter and the coupler, and the communication signals, which are different from the power line communication signals, transmit between the first terminal and the third terminal through the second filter, wherein the first filter has such an impedance that a first impedance characteristic in a first frequency band used for the power line communication signals is lower than a second impedance characteristic in other frequency band, and the second filter has such an impedance that a third impedance characteristic in a second frequency band used for the communication signals is lower than a fourth impedance characteristic in other frequency band including the first frequency band.

In the above-described configuration, quality of power line communications can be improved by utilizing a predetermined line other than a power line as a transmission line. Further, even when connecting a plurality of different types of communication apparatuses or electric appliances to a common line, interferences and reflections between signals can be prevented so as to maintain high individual communication quality.

The relay apparatus of the present invention that relays analog signals via a power line includes the following apparatuses: a first power terminal connected to the power line, a transmission line terminal connected to a wire transmission line that is different from the power line, and a coupler that connects the first power terminal and the transmission terminal to allow the analog signals to be transmitted bi-directionally.

In the above-described configuration, when performing wire communications indoors and the like, communications using a suitable wire transmission line selected from among a plurality of wire transmission lines, including a power line and other transmission lines, become possible.

DETAILED DESCRIPTION

The embodiments are explained in the following, with reference to the above-described drawings. The first embodiment of a relay apparatus is illustrated in the following with reference to FIGS. 1 through 8.

First Embodiment

In the present embodiment, for example, a communication system performs communications between different communication apparatuses using, for example, a power line as a transmission line. In this case, as shown in FIGS. 1 and 2, relay apparatus 10 connects to power line communication apparatus 100 which functions as a PLC modem performing multicarrier communication (hereinafter referred to as "multicarrier communication apparatus").

Figure 1:
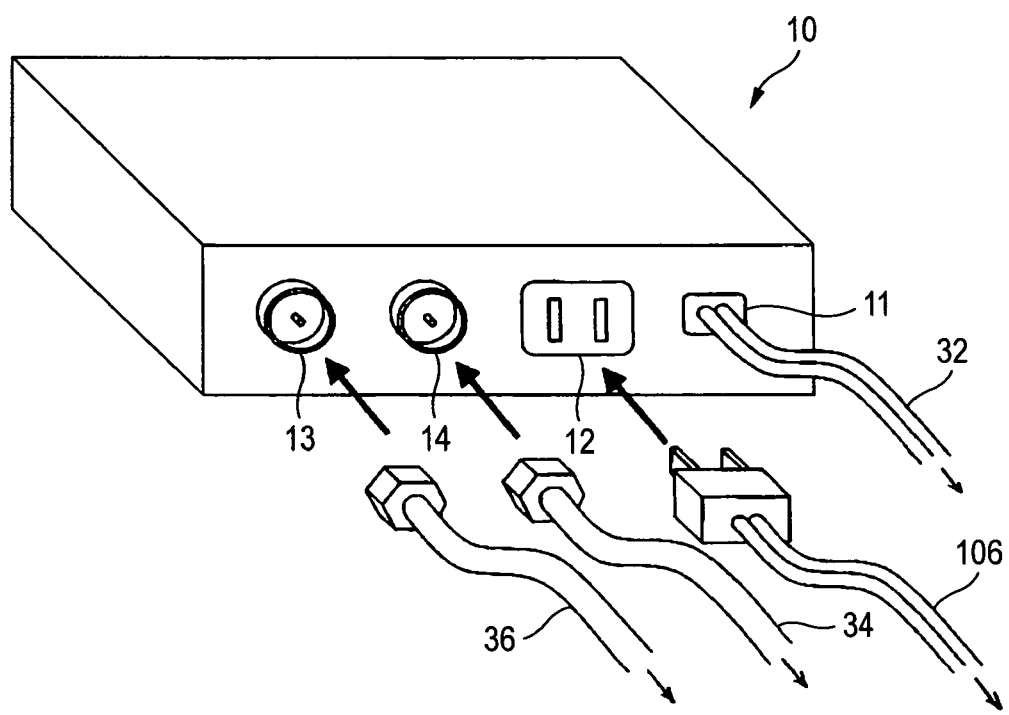
FIG. 1 is an external perspective view of a relay apparatus according to a first embodiment.
Figure 2:
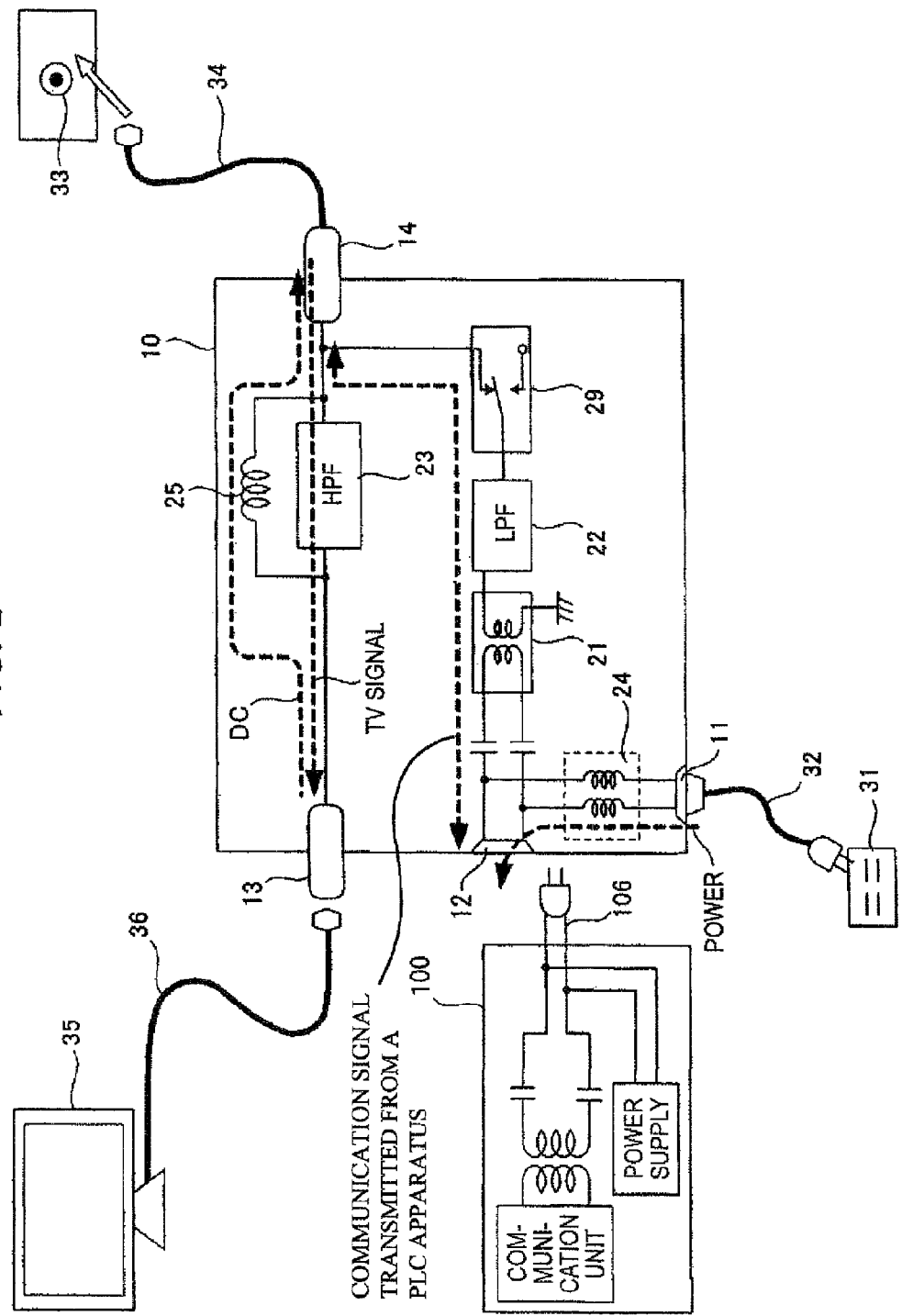
FIG. 2 is a block diagram illustrating a configuration of the relay apparatus according to the first embodiment.

In the examples shown in FIGS. 1 and 2, relay apparatus 10 is used to allow a home-use line (a coaxial line) that connects a TV antenna and a TV receiver to serve as a transmission line for multicarrier communication apparatus 100.

Relay apparatus 10 of the present embodiment includes modem connecting terminal 12, power line connecting terminal 11, electric appliance connecting terminal 13 and coaxial connecting terminal 14. Modem connecting terminal 12 is an example of a second terminal to be connected to multicarrier communication apparatus 100. Power line connecting terminal 11 is an example of a fourth terminal to be connected to a power line. Electric appliance connecting terminal 13 is an example of a third terminal to be connected to another electric appliance. Coaxial connecting terminal 14 is an example of a first terminal to be connected to another wire transmission line.

Modem connecting terminal 12 of relay apparatus 10 connects to AC cord 106 of multicarrier communication apparatus 100; and power line connecting terminal 11 of relay apparatus 10 connects to power outlet 31 via AC cord 32. These terminals connect to an indoor power line. Further, electric appliance connecting terminal 13 of relay apparatus 10 connects to TV receiver 35 via coaxial line 36; and coaxial connecting terminal 14 of relay apparatus 10 connects to TV antenna outlet 33 via coaxial line 34. These terminals connect to an indoor antenna line.

TV antenna outlet 33 connects to a predetermined TV antenna via an antenna line (a coaxial line). Further, TV antenna outlet 33 is installed in each of a plurality of rooms in the same residence, and connects to a common antenna line. Therefore, connecting multicarrier communication apparatuses 100 to respective antenna outlets 33 via relay apparatus 10, using the antenna line as a transmission line, enables communications among a plurality of multicarrier communication apparatuses 100.

Relay apparatus 10 further includes coupler 21, communication filter 22, communication filter 23, power filter 24, power filter 25 and selector 29. Coupler 21 has the following functions: a function for letting through communication signals (hereinafter referred to as "PLC signals") to be relayed to multicarrier communication apparatus 100, and a function for preventing low frequency components, such as a DC component and a commercial AC power frequency (50/60 Hz), from flowing into coaxial connecting terminal 14. Selector 29 turns on/off connection between coaxial connecting terminal 14 and coupler 21.

Communication filter 22 is an example of the first filter, more specifically to a low pass filter (LPF), and is connected between coupler 21 and selector 29. Communication filter 22 is capable of passing only signal components in a frequency band used for communications by multicarrier communication apparatus 100, in order to pass PLC signals. Communication filter 22 can be configured as a band pass filter (BPF) instead of the low pass filter.

Another communication filter 23 is an example of the second filter, more specifically to a high pass filter (HPF), and is connected between electric appliance connecting terminal 13 and coaxial connecting terminal 14. Communication filter 23 is capable of passing only signal components in a higher frequency band than the frequency band for communications by multicarrier communication apparatus 100, in order to pass TV broadcast signals (TV signals). Communication filter 23 can be configured as a band pass filter (BPF) instead of the high pass filter.

Figure 3A:
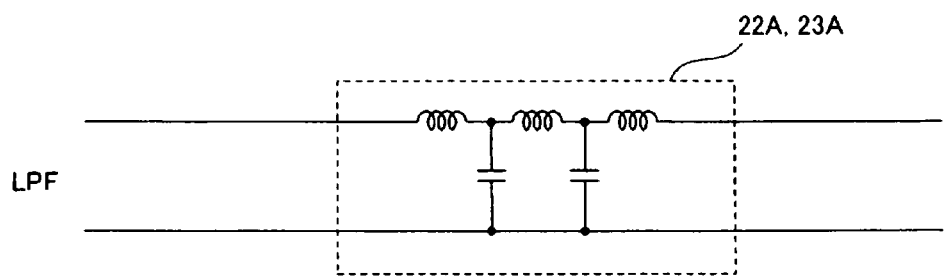
FIGS. 3A, 3B and 3C are electric diagrams illustrating specific configuration examples of filters of the relay apparatus according to the present embodiment.
Figure 3B:
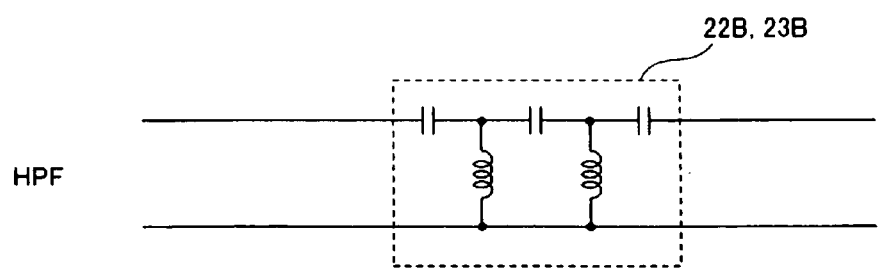
Figure 3C:
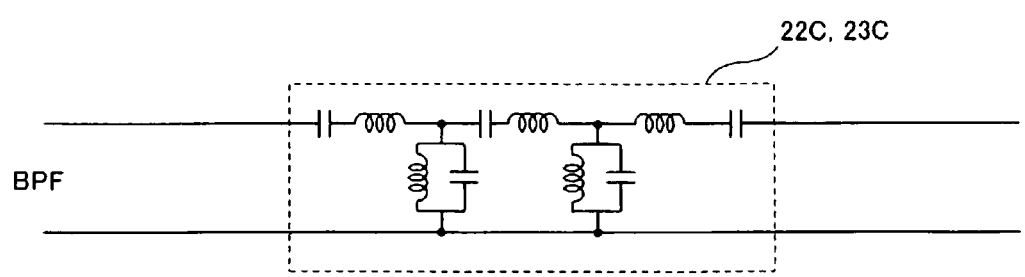

FIGS. 3A, 3B and 3C describe examples of specific circuit configurations of the filters that can be used as communication filters 22 and 23. In these examples, a plurality of condensers (capacitors) and a plurality of coils (inductors) configure these filters.

As shown in FIG. 3A, communication filters 22A and 23A function as a low pass filter. The coils with a constant predetermined in accordance with passing bands are connected in serial to transmission lines, while the condensers with a predetermined constant are connected in parallel to the transmission lines. If cutoff frequency of communication filters 22A and 23A is 1 to 10 MHz, for example, inductance of the coils is 0.1 to 1 μH and capacitance of the condensers is 10 to 100 pF.

As shown in FIG. 3B, communication filters 22B and 23B function as a high pass filter. The condensers with a constant predetermined in accordance with passing bands are connected in serial to the transmission lines, while the coils with a constant predetermined in accordance with passing bands are connected in parallel to the transmission lines. If cutoff frequency of communication filters 22B and 23B is 10 to 100 Mz, for example, inductance of the coils is 0.1 to 1 μH and capacitance of the condensers is 100 to 1000 pF.

As shown in FIG. 3C, communication filters 22C and 23C function as a band pass filter. The condensers with a constant predetermined in accordance with passing bands are connected in serial to the transmission lines, while the condensers and coils with predetermined constants are connected in parallel to the transmission lines. If higher cutoff frequency is 10 to 100 MHz and lower cutoff frequency is 1 to 10 MHz, for example, inductance of the coils and capacitance of the condensers in serial to the transmission lines are 0.1 to 1 μH and 100 to 1000 pF respectively, and inductance of the coils and capacitance of the condensers in parallel to the transmission lines are 0.1 to 1 μH and 10 to 100 pF respectively.

Power filter 24 is an example of the fourth filter that includes inductors such as coils and is connected between modem connecting terminal 12 and power line connecting terminal 11. Power filter 24 is a low pass filter that passes only low frequency components such as a DC component and a commercial AC power frequency (50/60 Hz). More specifically, power filter 24 passes commercial AC power supplied from power outlet 31 so as to be supplied to multicarrier communication apparatus 100, while blocking noise components and frequency components of PLC signals.

A description has been provided for a case where commercial AC power is supplied from power outlet 31 to multicarrier communication apparatus 100. When supplying power to multicarrier communication apparatus 100 by using a serial interface, such as a USB, or an Ethernet (registered trademark) cable (PoE), power outlet 31 is not used to supply power, thereby eliminating the need for power line connecting terminal 11, AC cord 32 and power filter 24.

Another power filter 25 is an example of the third filter that includes inductors such as coils and is connected to the two ends of communication filter 23. Power filter 25 is a lower pass filter that passes only DC components and very low frequency components. In other words, power filter 25 passes DC power for power supply and the like, but blocks the frequency components of the PLC signals.

The following describes an example of specific frequency characteristics. Frequency bands used in a standard home can be classified as shown in FIG. 4A or FIG. 4B.

Figure 4A:
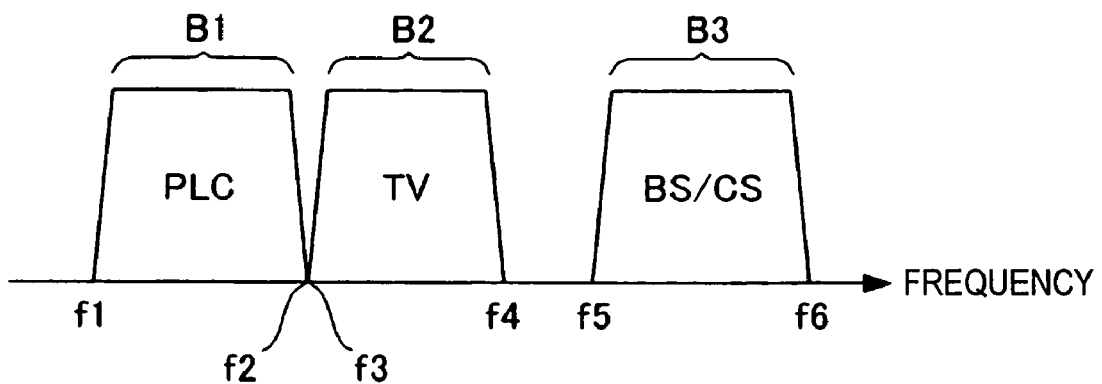
FIGS. 4A and 4B are diagrams illustrating examples of specific allocations of communication frequency bands.

More specifically, band B1 (f1-f2) shown in FIG. 4A is a frequency band used for power line communications and is allocated, for example, within a range of from 2 MHz (f1) to 28 MHz (f2). Band B2 (f3-f4) shown in FIG. 4A is a frequency band used for terrestrial TV broadcast transmission and has higher frequencies than band B1 used for the power line communications. Band B3 (f5-f6) shown in FIG. 4A is a frequency band used for satellite broadcast transmission by BS or CS and has higher frequencies than band B2 used for the terrestrial TV broadcast. Band B4 (f7-f8) shown in FIG. 4B is a frequency band used for cable TV broadcast (CATV) transmission and has higher frequencies than band B1 used for the power line communications.

Figure 4B:
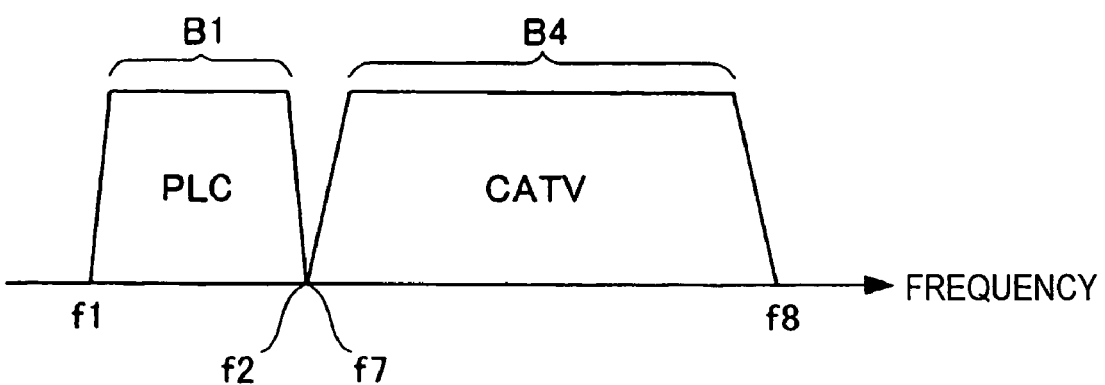

In the environment indicated in FIGS. 4A and 4B, the frequency characteristics of communication filter 22 are set so that an impedance characteristic is low in band B1 shown in FIGS. 4A and 4B, and an impedance characteristic is high in the other frequency bands. "Impedance characteristic" means a plurality of impedances corresponding to predetermined frequency band. In other words, when communication filter 22 is configured as a low pass filter, the frequency characteristics of communication filter 22 are set so that an impedance characteristic is low in the frequency band lower than frequency f2 shown in FIGS. 4A and 4B, and an impedance characteristic is high in the frequency bands higher than frequency f2. On the other hand, when communication filter 22 is configured as a band pass filter, the frequency characteristics of communication filter 22 are set so that an impedance characteristic is low within a range of frequencies from f1 to f2 shown in FIGS. 4A and 4B, and an impedance characteristic is high in the other frequency bands.

In the environment indicated in FIGS. 4A and 4B, the frequency characteristics of communication filter 23 are set so that an impedance characteristic is low in bands B2, B3 and B4 shown in FIGS. 4A and 4B, and an impedance characteristic is high in the other frequency bands. In other words, when communication filter 23 is configured as a high pass filter, the frequency characteristics of communication filter 23 are set so that an impedance characteristic is low in the frequency bands at or higher than frequency f3 and at or higher than frequency f7, and an impedance characteristic is high in the frequency bands lower than frequency f3 (f7). On the other hand, when communication filter 23 is configured as a band pass filter, the frequency characteristics of communication filter 23 are set so that an impedance characteristic is low within a range of frequencies from f3 to f6 or within a range of frequencies from f7 to f8 shown in FIGS. 4A and 4B, and an impedance characteristic is high in the other frequency bands.

Regarding the frequencies of the PLC signals (band B1) used for the power line communications, communication filter 23 in relay apparatus 10 has a considerably high impedance. Therefore, the impedance of an electric appliance connected to an end of communication filter 23, i.e., TV receiver 35 shown in FIG. 2, is negligible. Regarding the frequencies of the TV broadcast (band B2), on the other hand, communication filter 22 in relay apparatus 10 has a considerably high impedance. Therefore, the impedance of an electric apparatus connected to an end of communication filter 22, i.e., multicarrier communication apparatus 100 shown in FIG. 2 is negligible.

More specifically, when connecting multicarrier communication apparatus 100 to an antenna line for TV reception via relay apparatus 10, the impedances of respective apparatuses can be considered separately per frequency band. In other words, regarding an impedance matching for communications by multicarrier communication apparatus 100, the impedance of TV receiver 35 is negligible. Regarding an impedance matching for TV broadcast reception, the impedance of multicarrier communication apparatus 100 is negligible. Therefore, even when connecting different types of electric appliances with no specified impedance or other standard specifications to a common transmission line, it is possible to prevent an impedance mismatching and suppress reflections generated in transmission signals such as PLC signals and TV signals.

When transmitting PLC signals via a power line and a coaxial line as a transmission line (e.g., when bridging a coaxial line and a power line), when an electric appliance with a low impedance (e.g., a charger) or an electric appliance that outputs noise (e.g., an inverter) is connected to the power line transmission line, the frequency characteristics of the transmission line become unstable. Accordingly, the impedance of multicarrier communication apparatus 100 needs to be set as low as possible so that the PLC signals are not lost halfway on the transmission line. According to the first embodiment, communication filters 22 and 23 can ignore the impedance of the other appliance in their filter passing bands. Therefore, even when the impedance of multicarrier communication apparatus 100 is set low, respective electric appliances (TV receiver 35 and multicarrier communication apparatus 100 in FIG. 2) are not affected by each other, thereby enabling smooth communications by each appliance.

Figure 5A:
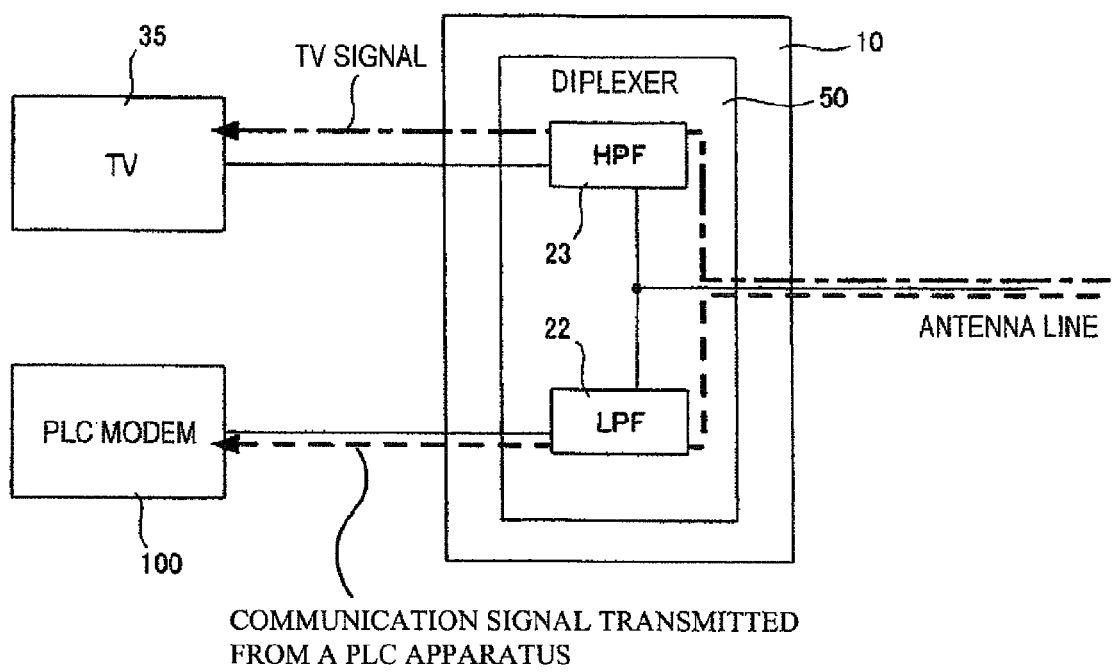
FIG. 5A is a block diagram illustrating a configuration of a main part performing an operation according to the first embodiment.
Figure 5B:
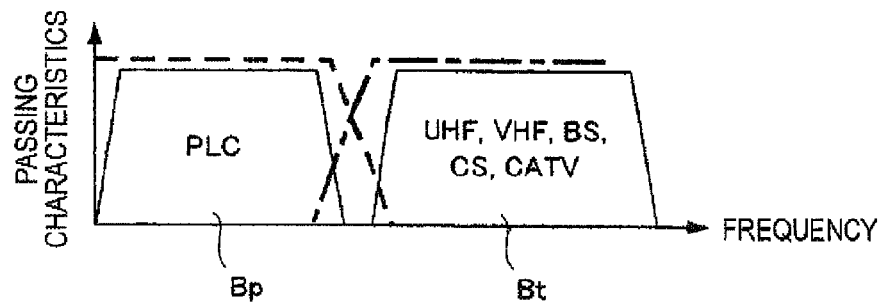
FIG. 5B is a diagram illustrating frequency characteristics in the operation according to the first embodiment.

Relay apparatus 10 of the present embodiment, as shown in FIG. 5A, includes diplexer 50 that includes communication filter (LPF) 22 and communication filter (HPF) 23. More specifically, as shown in FIG. 5B, communication filter 22 passes only PLC signals in frequency band Bp and transmits/receives the PLC signals to/from multicarrier communication apparatus (PLC modem) 100, while communication filter 23 passes only TV broadcast signals in frequency band Bt that is higher than frequency band Bp for the PLC signals, and supplies the TV signals to TV receiver 35.

When relay apparatus 10 according to the present embodiment is used, power filter 24 blocks PLC signals. Accordingly, the PLC signals transmitted by multicarrier communication apparatus 100 are not on AC cord 32, power outlet 31 and the power line. Therefore, instead of the power line, the antenna line (coaxial line 34) that connects to TV antenna outlet 33 is used as a transmission line. Further, even when noise occurs on the power line side, high-frequency noise components are blocked by power filter 24 so that the noise dose not affect communications. Further, DC components pass through power filter 25 via the line between electric appliance connecting terminal 13 and coaxial connecting terminal 14. Therefore, it becomes possible to supply DC power for power supply via the line from TV receiver 35 to coaxial line 36. In this case, DC power is relayed from TV receiver 35 via power filter 25 in relay apparatus 10 to coaxial line 34 and TV antenna outlet 33, so that the DC power can be supplied to electric circuits of a TV antenna or a booster (not shown in the drawings).

Figure 6:
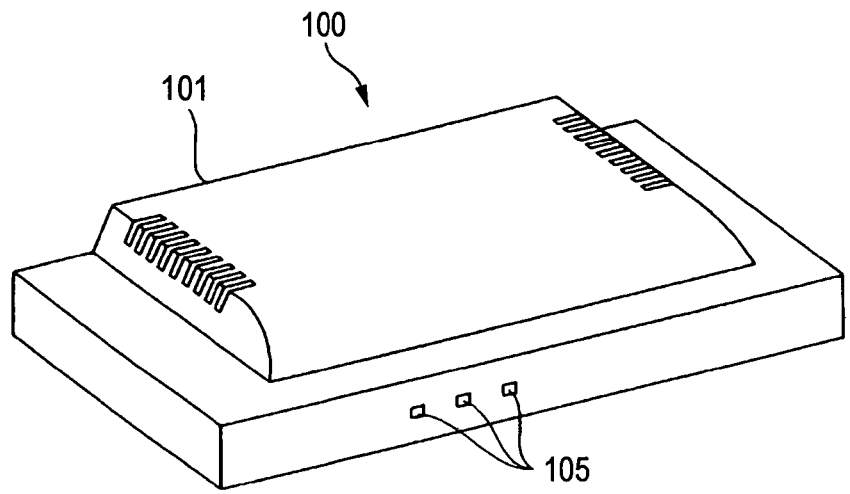
FIG. 6 is a perspective view of a multicarrier communication apparatus when viewed from front.
Figure 7:
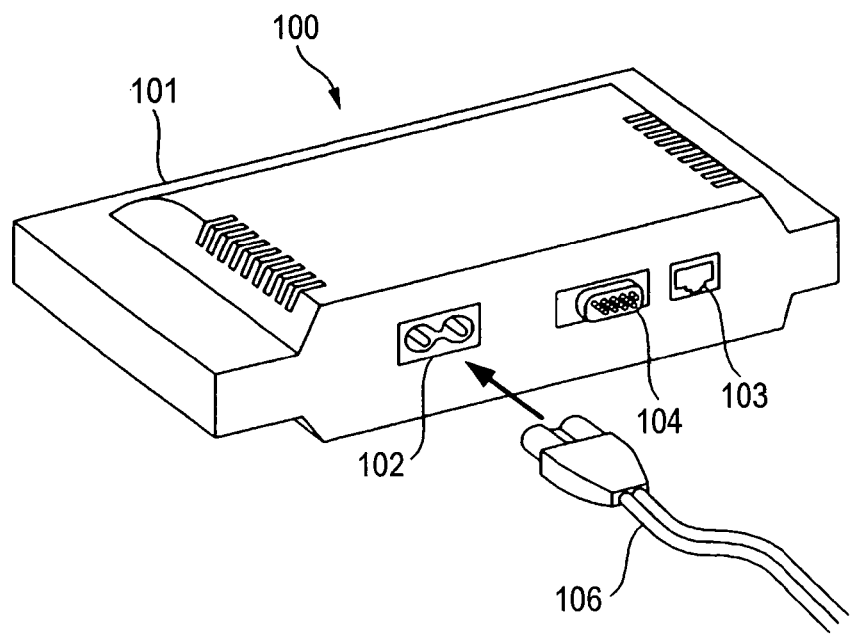
FIG. 7 is a perspective view of the multicarrier communication apparatus when viewed from rear.
Figure 8:
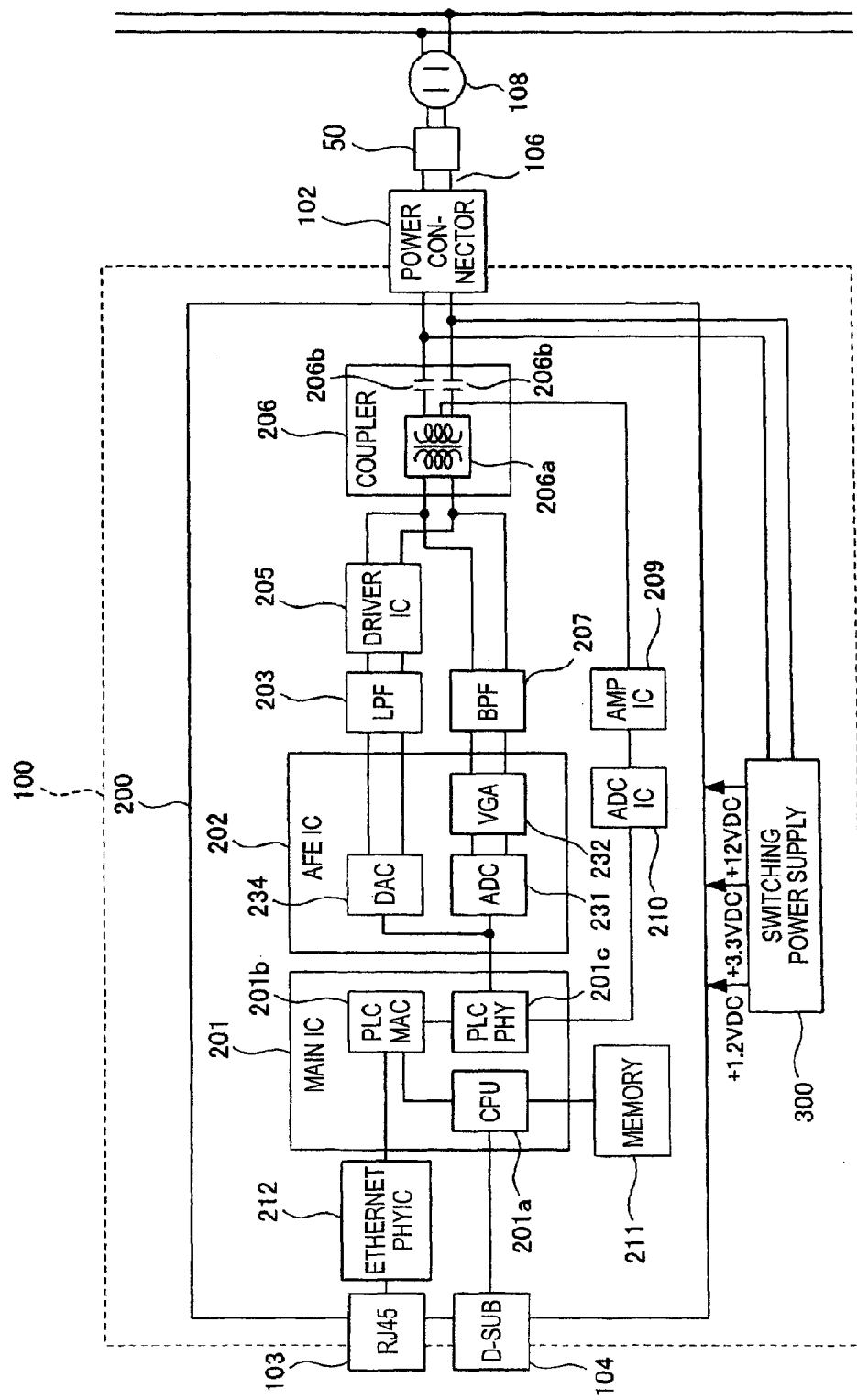
FIG. 8 is a block diagram illustrating a configuration example of an electric circuit of the multicarrier communication apparatus.

FIGS. 6 through 8 illustrate specific configuration examples of the multicarrier communication apparatus. Multicarrier communication apparatus 100 is a communication terminal that performs power line communications by being connected to relay apparatus 10 of the present embodiment via the antenna line. More specifically, it is configured as a modem (a PLC modem). Of course, the relay apparatus of the present embodiment can also be used by connecting to an electric appliance equipped with a modem (e.g., a home appliance such as a TV set) instead of a modem.

Multicarrier communication apparatus 100 has, in chassis 101 shown in FIGS. 6 and 7, built-in electric circuit module 200 as shown in FIG. 8. As shown in FIG. 6, display 105 is provided on the front of chassis 101. Display 105 includes a plurality of LEDs (Light Emitting Diodes), etc. As shown in FIG. 7, power terminal 102 and LAN (Local Area Network) modular jack 103 for cable connections, such as RJ 45, and Dsub terminal 104 for serial cable connections are provided on the rear of chassis 101. As shown in FIG. 7, AC cord 106 including, for example, parallel cables, connects to power terminal 102. A LAN cable (not shown in the drawings) connects to modular jack 103. Serial cables (not shown in the drawings) connect to Dsub terminal 104.

As shown in FIG. 8, multicarrier communication apparatus 100 incorporates circuit module 200 and switching power supply 300. AC cord 106, which connects to power terminal 102, connects directly to power outlet 108 in FIG. 8. However, when using relay apparatus 10 of the above-described present embodiment, AC cord 106 connects to modem connecting terminal 12 of relay apparatus 10; and AC cord 32, which connects to power line connecting terminal 11 of relay apparatus 10, connects to power outlet 31. Therefore, switching power supply 300 receives commercial AC power (100V AC) from the power line via relay apparatus 10, generates DC voltages, i.e., +1.2V, +3.3V and +12V, and supplies the voltages to circuit module 200.

Circuit module 200 incorporates main IC (Integrated Circuit) 201, AFE (Analog Front End) IC 202, low pass filter (LPF) 203, driver IC 205, coupler 206, band pass filter (BPF) 207, amplifier (AMP IC) 209, AD converter IC (ADC IC) 210, memory 211 and Ethernet (registered trademark) physical layer IC (PHY IC) 212.

Main IC 201 includes CPU (Central Processing Unit) 201a, PLC MAC (Power Line Communication Media Access Control) block 201b and PLC PHY (Power Line Communication Physical layer) block 201c. AFE IC 202 includes DAC 234, ADC 231 and variable gain amplifier (VGA) 232. Coupler 206 includes coil transformer 206a and condenser 206b.

As shown in FIG. 8, circuit module 200 is capable of data transmission/reception between different terminals using, for example, multicarrier signals such as OFDM (Orthogonal Frequency Division Multiplexing) signals. For such data communications, a power line is used as a transmission line with a predetermined frequency band allotted to the power line. This eliminates the need for a power line specially provided for data communications. When satisfactory communication quality cannot be achieved by using the power line, for example, it is also possible to supplementarily use, via relay apparatus 10, another transmission line, e.g., a coaxial line installed for connecting a TV antenna and a TV receiver and a telephone line installed for connecting a telephone receiver, for data communications.

As described above, when using the relay apparatus of the present embodiment, multicarrier communication apparatus 100 that performs power line communications connects to modem connecting terminal 12; a power line connects to power line connecting terminal 11; an coaxial line or the like connects to antenna line connecting terminal 14; and TV receiver 35 or the like connects to electric appliance connecting terminal 13. In this configuration, multicarrier communication apparatus 100 connects to the antenna line via coupler 21 and communication filter 22 in the relay apparatus. Therefore, quality of power line communications can be improved by using the antenna line instead of the power line as a transmission line.

In this example, TV receiver 35 and multicarrier communication apparatus 100 connect to the common antenna line transmission line. However, the frequency band for PLC signals used for power line communications and the frequency band for TV signals used for TV reception are divided to be independent from one another, depending on the frequency characteristics of communication filters 22 and 23.

More specifically, an impedance characteristic is low in the frequency band for PLC signals, while an impedance characteristic is high in the other frequency bands on communication filter 22. Thus, the impedances of communication filter 22 and multicarrier communication apparatus 100 are negligible in the frequency band for TV signals. Further, since an impedance characteristic is high in the other frequency bands, while an impedance characteristic is low in the frequency band for TV signals on communication filter 23, the impedances of communication filter 23 and TV receiver 35 are negligible. Therefore, an impedance mismatching and signal reflections can be prevented, thereby ensuring high communication quality.

Further, since the frequency bands for PLC signals and TV signals are divided, signals transmitted by multicarrier communication apparatus 100 are prevented from being input into TV receiver 35 or the like as noise, while signals transmitted by TV receiver 35 are prevented from being input into multicarrier communication apparatus 100 as noise. Therefore, deterioration of the S/N ratio for both apparatuses can be suppressed.

Therefore, when the relay apparatus of the present embodiment is used, it is possible to improve quality of power line communications by using an existing antenna line as a transmission line. Moreover, even when the multicarrier communication apparatus and TV receiver are connected to the common antenna line, the two apparatuses can avoid adversely affecting each other by eliminating an impedance mismatching, thereby preventing signal reflections and the like in order to maintain high communication quality.

Second Embodiment

Figure 9:
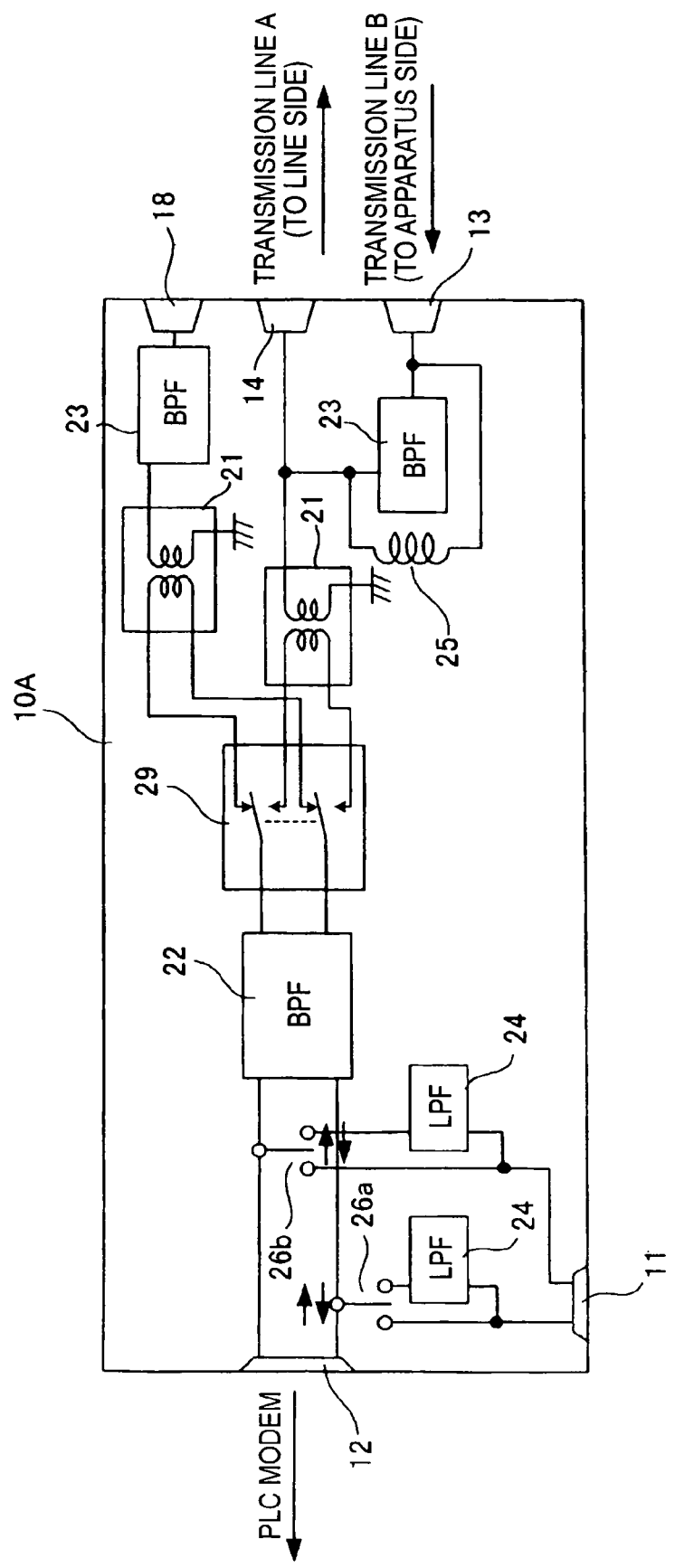
FIG. 9 is a block diagram illustrating a configuration of a relay apparatus according to a second embodiment.

The second embodiment of a relay apparatus is described in the following with reference to FIGS. 9 and 10A through 10E. The second embodiment is a modified example of the first embodiment. Components corresponding to those of the first embodiment in FIG. 9 are assigned the same numbers. Components and operations different from those of the first embodiment are described in the following.

Relay apparatus 10A according to the second embodiment includes the above-described power line connecting terminal 11 for external connection, modem connecting terminal 12, electric appliance connecting terminal 13, coaxial connecting terminal 14 and line connecting terminal 18. Line connecting terminal 18 connects to a telephone line or the like. As with the first embodiment, relay apparatus 10A further includes couplers 21, communication filters 22 and 23, and power filters 24 and 25. Further, relay apparatus 10A includes selector 29, and switches 26a and 26b. Selector 29 selects and switches to the selected transmission line for use. Switches 26a and 26b turn on/off connection to power filter 24.

In relay apparatus 10A, selector 29 selects either coaxial connecting terminal 14 or line connecting terminal 18 and connects the selected terminal to communication filter 22. Communication filter 23 and power filter 25 are connected in parallel between coaxial connecting terminal 14 and electric appliance connecting terminal 13. Further, communication filter 23 is connected between selector 29 and line connecting terminal 18. Further, couplers 21 having appropriate characteristics for lines are connected between selector 29 and coaxial connecting terminal 14 and between selector 29 and line connecting terminal 18, respectively. In this example, communication filters 22 and 23 are configured as band pass filters (BPFs).

Switches 26a and 26b are examples of a first switch unit and switch connections to determine whether or not to bypass power filter 24. When using an antenna line or a telephone line as a transmission line for power line communications by switching connections at selector 29 after connecting a cable to coaxial connecting terminal 14 or line connecting terminal 18, power filter 24 is connected between modem connecting terminal 12 and power line connecting terminal 11. On the other hand, when directly using a power line as a transmission line for the power line communications without using the antenna line or the telephone line, power filter 24 is bypassed.

Relay apparatus 10A can serve as a bridge to transmit communication signals between power line connecting terminal 11 and at least one of coaxial connecting terminal 14, line connecting terminal 18 and modem connecting terminal 12. In this case, power filters 24 can be bypassed by switching connections at switches 26a and 26b.

Next, a description is provided for specified examples illustrating frequency band allocations employed by the relay apparatus with reference to FIGS. 10A through 10E. In FIGS.

Figure 10A:
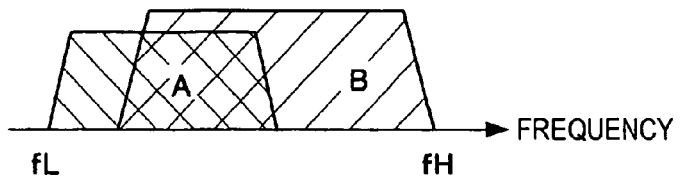
FIGS. 10A through 10E are diagrams illustrating examples of band limits for frequency bands according to the present embodiment.

10A through 10E, the upper limit frequency in an available frequency band is indicated as fH, while the lower limit frequency in an available frequency band is indicated as fL. In this example, as shown in FIG. 10A, both the communication apparatus and another electric appliance connect to a common line, e.g., the telephone line, and the frequency bands used by the two apparatuses partially overlap with each other. For example, when using both HomePNA (Home Phoneline Networking Alliance) using the telephone line and power line communications, frequency bands thereof partially overlap with each other. In this case, the frequency band for HomePNA is indicated as group A, while the frequency band for power line communications is indicated as group B.

Figure 10B:
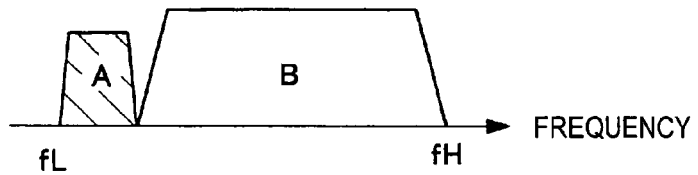
Figure 10C:
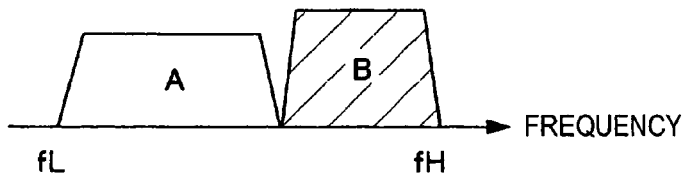
Figure 10D:
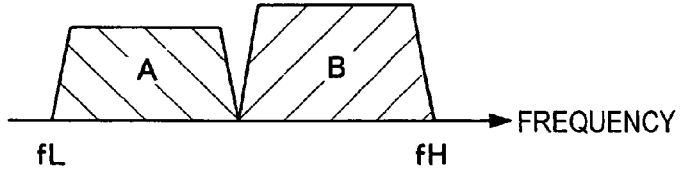

In the environment indicated in FIG. 10A, the frequency bands can be divided as shown in FIGS. 10B, 10C and 10D by providing communication filters 22 and 23 in relay apparatus 10A. In other words, when communication filter 23 that has a band pass filter or a low pass filter is connected between selector 29 and line connecting terminal 18, communication filter 23 blocks the high frequency band for HomePNA of group A to limit the band, dividing the frequency bands into groups A and B as shown in FIG. 10B.

Further, when communication filter 22 that includes a band pass filter or a high pass filter is connected between selector 29 and modem connecting terminal 12, communication filter 22 blocks the low frequency band of group B for power line communications to limit the band, dividing the frequency bands into groups A and B as shown in FIG. 10C.

Further, communication filter 23 that includes a band pass filter or a low pass filter is connected between selector 29 and line connecting terminal 18, and communication filter 22 that has a band pass filter or a high pass filter is connected between selector 29 and modem connecting terminal 12. In this configuration, communication filter 23 blocks the high frequency band of group A to limit the band, while communication filter 22 blocks the low frequency band of group B to limit the band. Accordingly, the frequency band of group A and the frequency band of group B are divided as indicated in FIG. 10D.

Figure 10E:
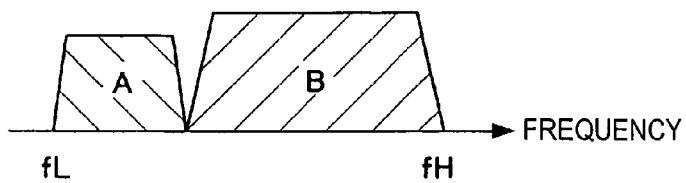

Further, as shown in FIG. 10E, a band division ratio of the frequency bands of groups A and B can be modified by changing the filter passing characteristics of communication filters 22 and 23. In this case, the filter passing characteristics are modified by switching connections at a plurality of filters with different characteristics or varying the constants of the elements in the filters.

According to the second embodiment, switching connections at selector 29 can select either the antenna line connected to coaxial connecting terminal 14 or the telephone line or the like connected to line connecting terminal 18 as a transmission line for multicarrier communication apparatus 100 connected to modem connecting terminal 12. Also, switching connections at switches 26a and 26b can select either the power line or another line as a transmission line.

Third Embodiment

Figure 11:
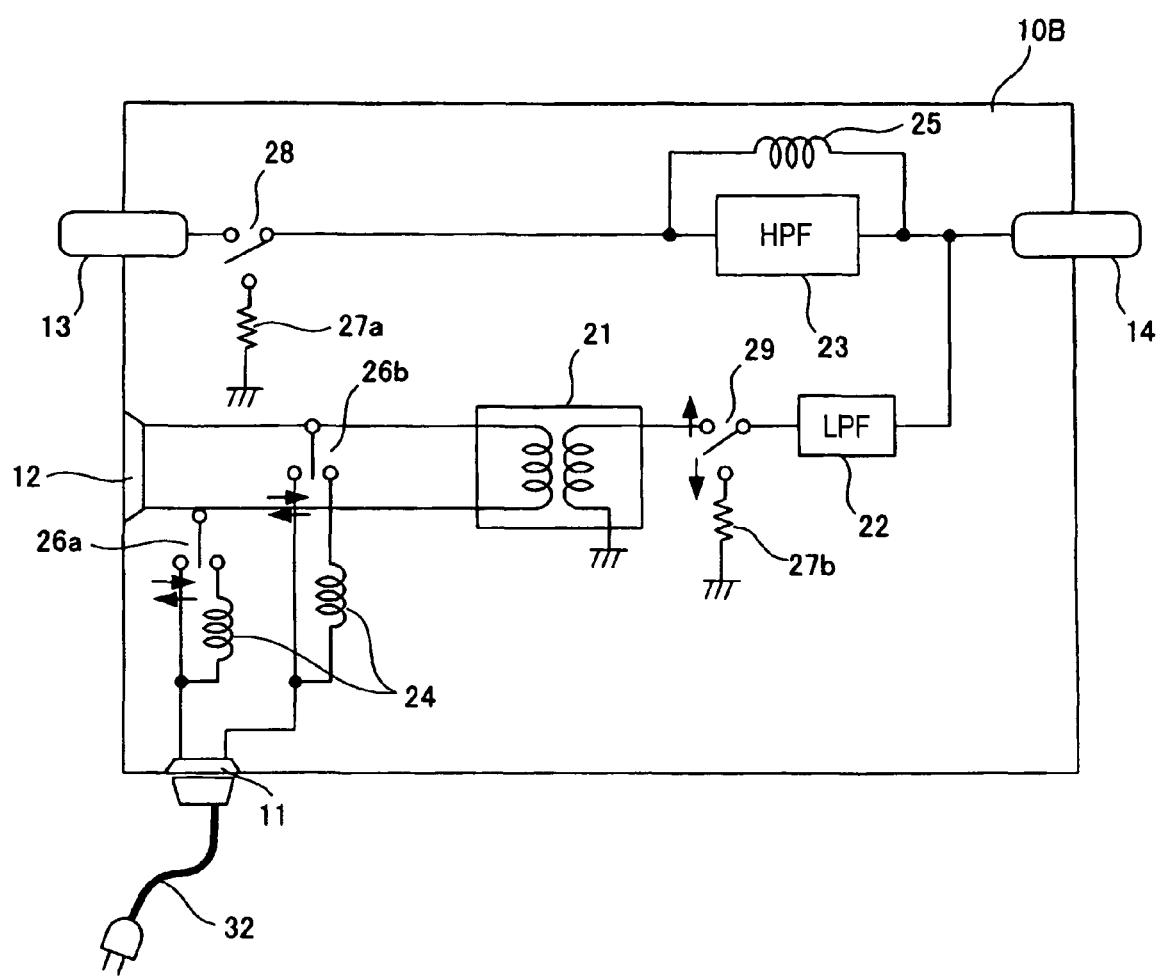
FIG. 11 is a block diagram illustrating a configuration of a relay apparatus according to a third embodiment.

A relay apparatus according to the third embodiment is described in the following with reference to FIG. 11. The third embodiment is a modified example of the first embodiment. Components corresponding to those of the first embodiment in FIG. 11 are assigned the same numbers. Components and operations different from those of the first embodiment are described in the following.

Relay apparatus 10B according to the third embodiment, as with the first embodiment, includes coupler 21, communication filters 22 and 23, and power filters 24 and 25. Relay apparatus 10B further includes switches 26a and 26b that turn on/off connection to power filter 24, terminal resistors 27a and 27b that terminate a signal transmission line or a connecting terminal, switch 28 that turns on/off connection to terminal resistor 27a, and selector 29 that selects a transmission line for power line communications and turns on/off connection to terminal resistor 27b. The transmission line can be switched at selector 29 between the line on the power line connecting terminal 11 side and the line on the coaxial connecting terminal 14 side, the transmission line being for communications by multicarrier communication apparatus 100 connected to modem connecting terminal 12.

Switches 26a and 26b are examples of a first switch unit and switch connections to determine whether or not to bypass power filter 24, as with the second embodiment. When using an antenna line or the like as a transmission line for power line communications, power filter 24 is connected between modem connecting terminal 12 and power line connecting terminal 11. When directly using a power line as a transmission line for the power line communications, power filter 24 is bypassed.

Selector 29 is provided between coupler 21 and communication filter 22. When using the antenna or the like as a transmission line for the power line communications, coupler 21 and communication filter 22 are connected. On the other hand, when directly using the power line as a transmission line for the power line communications, coupler 21 on the modem connecting terminal 12 side and communication filter 22 are disconnected, and communication filter 22 connects to terminal resistor 27b that is an example of a first terminating unit, thereby terminating the transmission line from communication filter 22 near coupler 21 to coaxial connecting terminal 14. In this example, terminal resistor 27b has the resistance component whose value is the same as the characteristic impedance of the transmission line for the power line communications. By terminating an unconnected transmission line which is not selected, an impedance matching can be maintained, thereby preventing signal reflections on the transmission line. Accordingly, deterioration of the S/N ratio for transmission signals (PLC signals in this example) can be suppressed.

Switch 28 is an example of a second switch unit and is provided between communication filter 23 and electric appliance connecting terminal 13. When being connected to TV receiver 35, electric appliance connecting terminal 13 connects to communication filter 23. When TV receiver 35 is not connected to electric appliance connecting terminal 13, communication filter 23 connects to terminal resistor 27a that is an example of a second terminating unit, thereby opening the transmission line near electric appliance. In this example, terminal resistor 27a has the resistance component whose value is the same as the characteristic impedance of the transmission line for electric appliance connecting terminal 13. When an external electric appliance is not connected, an impedance matching can be maintained by terminating the connecting terminal, thereby preventing signal reflections on the transmission line. Accordingly, deterioration of the S/N ratio for transmission signals (TV signals in this example) can be suppressed.

According to the third embodiment, switching connections at selector 29 can select either the antenna line connected to coaxial connecting terminal 14 or the power line connected to power line connecting terminal 11 as a transmission line for multicarrier communication apparatus 100 connected to modem connecting terminal 12. When selector 29 does not select the coaxial connecting terminal 14 side, terminal resistor 27b terminates the transmission line to suppress an impedance mismatching, thus preventing deterioration of communication quality. When TV receiver 35 or the like is not connected to electric appliance connecting terminal 13, terminal resistor 27a terminates the connecting terminal to suppress an impedance mismatching, thus preventing deterioration of communication quality.

Fourth Embodiment

Figure 12:
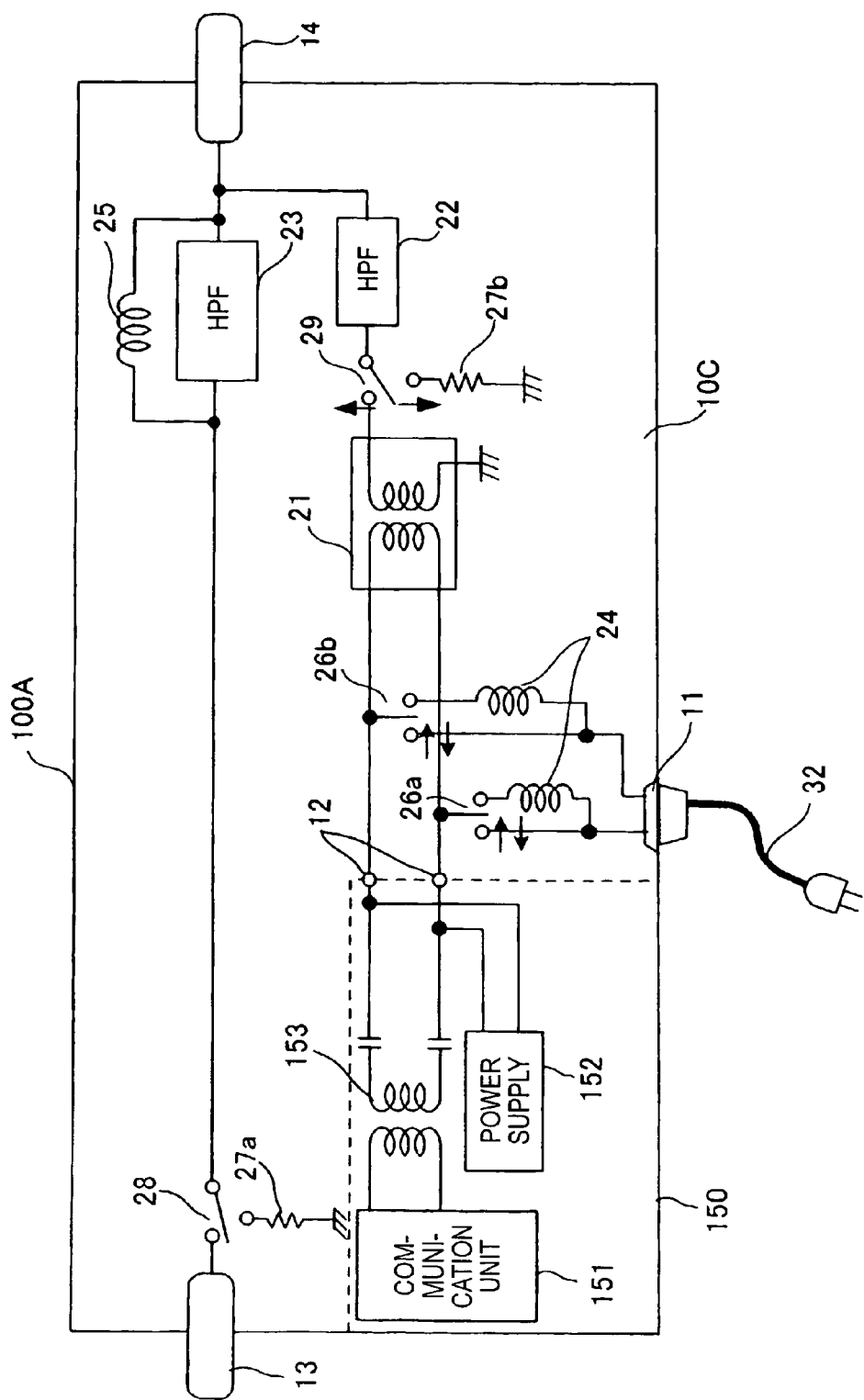
FIG. 12 is a block diagram illustrating a configuration of a relay apparatus according to a fourth embodiment.

The fourth embodiment of a relay apparatus is described in the following with reference to FIG. 12. The fourth embodiment is a modified example of the first and third embodiments. Components corresponding to those of the first and third embodiments in FIG. 12 are assigned the same numbers. Components and operations different from those of the first and third embodiments are described in the following.

Relay apparatus 10C according to the fourth embodiment is integrally installed in multicarrier communication apparatus 10A. Modem connecting terminals 12 of relay apparatus 10C connect to modem 150 in multicarrier communication apparatus 100A. Modem 150 includes communication unit 151, power supply 152 and connection transformer 153. Communication unit 151 connects to a secondary winding wire of connection transformer 153; a primary winding wire of connection transformer 153 and power supply 152 connect to a power line via modem connecting terminals 12.

As with the third embodiment, relay apparatus 10C includes coupler 21, communication filters 22 and 23, power filters 24 and 25, switches 26a and 26b, terminal resistors 27a and 27b, switch 28 and selector 29. In this case, the frequency characteristics of communication filters 22 and 23 are set according to a frequency band for PLC signals used by modem 150 of multicarrier communication apparatus 100A and a frequency band for signals used by an electric appliance connected to coaxial connecting terminal 14.

According to the fourth embodiment, incorporating relay apparatus 10C into multicarrier communication apparatus 100A enables selective use of a transmission line, such as an antenna line, which is connected to coaxial connecting terminal 14 in power line communications. In that process, it becomes possible to maintain an impedance matching and high communication quality. This configuration can also increase the number of outlets available while performing power line communications.

Fifth Embodiment

Figure 13:
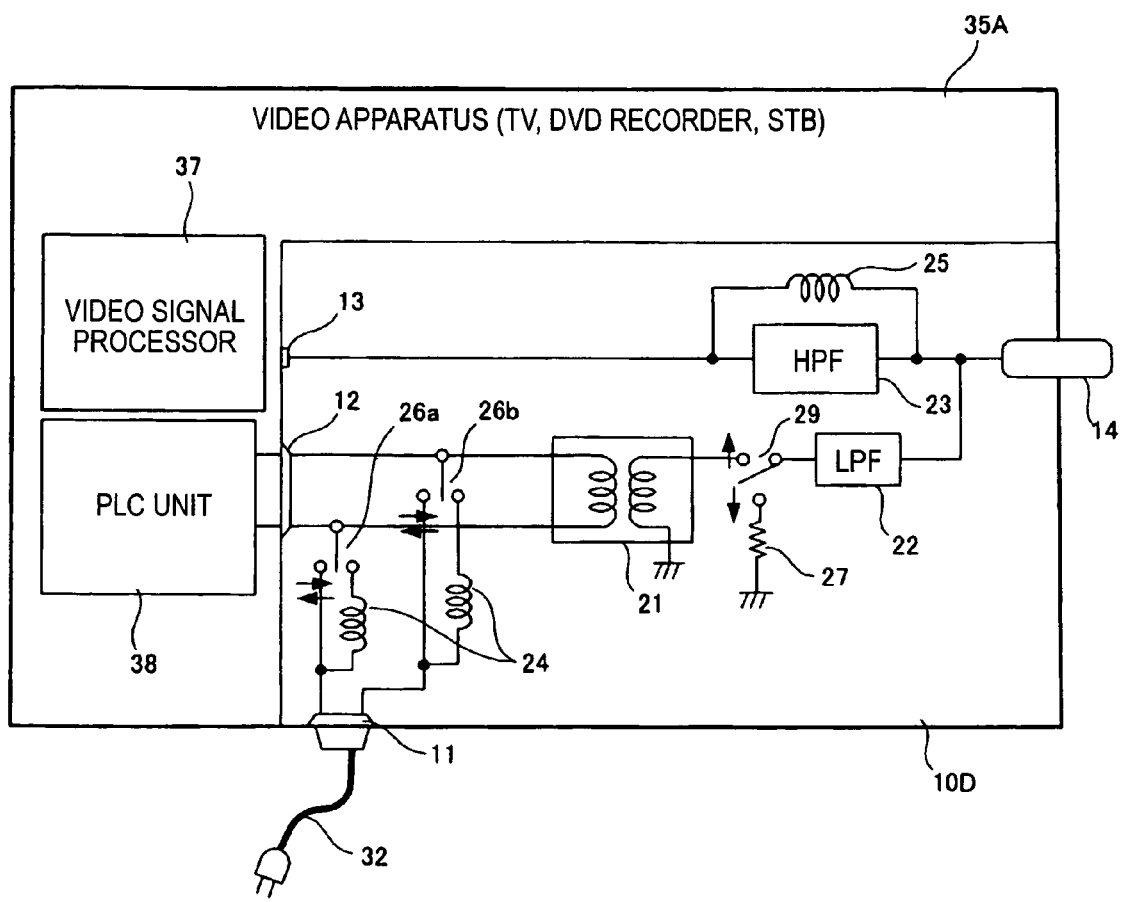
FIG. 13 is a block diagram illustrating a configuration of a relay apparatus according to a fifth embodiment.

The fifth embodiment of a relay apparatus is described in the following with reference to FIG. 13. The fifth embodiment is a further modified example of the first and third embodiments. Components corresponding to those of the first and third embodiments in FIG. 13 are assigned the same numbers. Components different from those of the first and third embodiments are described in the following.

Relay apparatus 10D according to the fifth embodiment is integrally installed in video apparatus 35A such as a TV receiver (TV), a DVD recorder and a set-top box (STB). Modem connecting terminal 12 of relay apparatus 10D connects to PLC unit 38 for power line communications. PLC unit 38 installed in video apparatus 35A has the same functions as the above-described multicarrier communication apparatus 100. Electric appliance connecting terminal 13 connects to video signal processor 37 as an example of a processor provided in video apparatus 35A. Video signal processor 37 processes video signals such as TV signals.

Coaxial connecting terminal 14 of relay apparatus 10D serves commonly as the antenna input terminal to be built in video apparatus 35A. Power line connecting terminal 11 of relay apparatus 10D serves commonly as the power input terminal to be built in video apparatus 35A and connects to AC cord 32 to be plugged into a power outlet.

As with the third embodiment, relay apparatus 10D includes coupler 21, communication filters 22 and 23, power filters 24 and 25, switches 26a and 26b, terminal resistor 27 and selector 29. In this case, the frequency characteristics of communication filters 22 and 23 are set according to a frequency band for video signals used by video apparatus 35A and a frequency band for PLC signals used by PLC unit 38. PLC unit 38 has the same configuration as multicarrier communication apparatus 100 shown in FIG. 8. Video signal processor 37 is configured to decode compressed image data, using a compress/decompress method such as MPEG (Moving Picture Coding Experts Group) and JPEG (Joint Photographic Coding Experts Group). When video signal processor 37 is a TV receiver, it has a display.

Since relay apparatus 10D according to the fifth embodiment is integrally configured with video apparatus 35A, when electrically controllable switches, which are indicated as selector 29, and switches 26a and 26b (e.g., a transistor, a relay, etc.), are used, switching connections at selector 29 and switches 26a and 26b can be made by a remote controller (not shown in the drawings) for remotely operating video apparatus 35A.

According to the fifth embodiment, relay apparatus 10D installed in video apparatus 35A enables power line communications using a transmission line used for video signal transmission, during which an impedance matching and high communication quality can be maintained. This configuration can also increase the number of outlets available while performing the power line communications.

For communication filters 22 and 23 indicated in each of the above-described embodiments, frequency characteristics thereof may be variable. More specifically, when using a variable resistor, a variable inductor, a variable condenser, etc., as the filter circuit components shown in FIG. 3, the frequency characteristics of the filters can be modified by changing the impedance for each element. When using electrically controllable elements, such as a variable capacitance diode, a transistor and a switched capacitor, as the filter circuit components, can modify the frequency characteristics of the filters by electric control.

When a plurality of filters is configured to be independent from one another as components of communication filters, to be connected in parallel, and to be selectively connected by a switch, switching connections at the switch can modify the frequency characteristics of the communication filters. In this case, when using a transistor, a relay, etc., as a switch, the frequency characteristics can be modified by electric control.

The user may manually change the frequency characteristics of communication filters 22 and 23, while the frequency characteristics may also be automatically changed when such a change can be made by electric control. More specifically, the relay apparatus detects signals output from an electric appliance connected to each terminal of the relay apparatus and identifies the type of the connected electric appliance. This process enables the relay apparatus to automatically select the frequency characteristics of communication filters 22 and 23 so as to use a frequency band suitable for the type of the connected electric appliance.

As described above, the relay apparatus according to the present embodiment can be connected to an antenna line, a telephone line, etc., and use these wire transmission lines instead of a power line as transmission lines. In this case, a PLC apparatus and another electric appliance are connected to a common wire transmission line. However, PLC signals transmitted by the PLC apparatus and signals transmitted by the other electric appliance do not interfere with one another, thereby preventing an impedance mismatching. Accordingly, transmission signal reflections can be prevented to secure high communication quality. Moreover, the PLC apparatus and the other electric appliance connected to the common wire transmission line can avoid adversely affecting each other.

Further, since frequency bands are divided for the use of the PLC apparatus and the other electric appliance, the PLC signals transmitted by the PLC apparatus are prevented from being input into the other electric appliance as noise. At the same time, the signals transmitted by the other electric appliance are prevented from being input into the PLC apparatus as noise. Accordingly, deterioration of the S/N ratio for the respective apparatuses can be prevented.

When connecting a communication apparatus for power line communications at home, communication quality can be improved, for example, by utilizing the relay apparatus of the present embodiment to relay PLC signals and using an existing transmission line such as a coaxial line for a TV antenna and a telephone line. Moreover, when the relay apparatus of the present embodiment is used, it is possible to divide and allocate frequency bands for different types of electric appliances while maintaining an impedance matching, even when a plurality of different types of electric appliances is simultaneously connected to a common transmission line. Therefore, interference between signals transmitted by the plurality of different types of electric appliances can be suppressed. Accordingly, the plurality of different types of electric appliances can transmit signals using the common transmission line and yet individual methods. Signal reflections among the plurality of connected electric appliances can be prevented, thereby avoiding deterioration of a S/N ratio.

Sixth Embodiment

In the present embodiment, as an example of an electric appliance that enables wire communications via a plurality of transmission lines, embodiment examples of the following apparatuses are described: a bridge apparatus that enables wire communications via a power line, a TV antenna line and a telephone line wired indoors, a communication adapter for power line communications and a PLC apparatus having functions of the communication adapter. The bridge apparatus and communication adapter are examples of a relay apparatus that relays analog signals via the power line.

Figure 14:
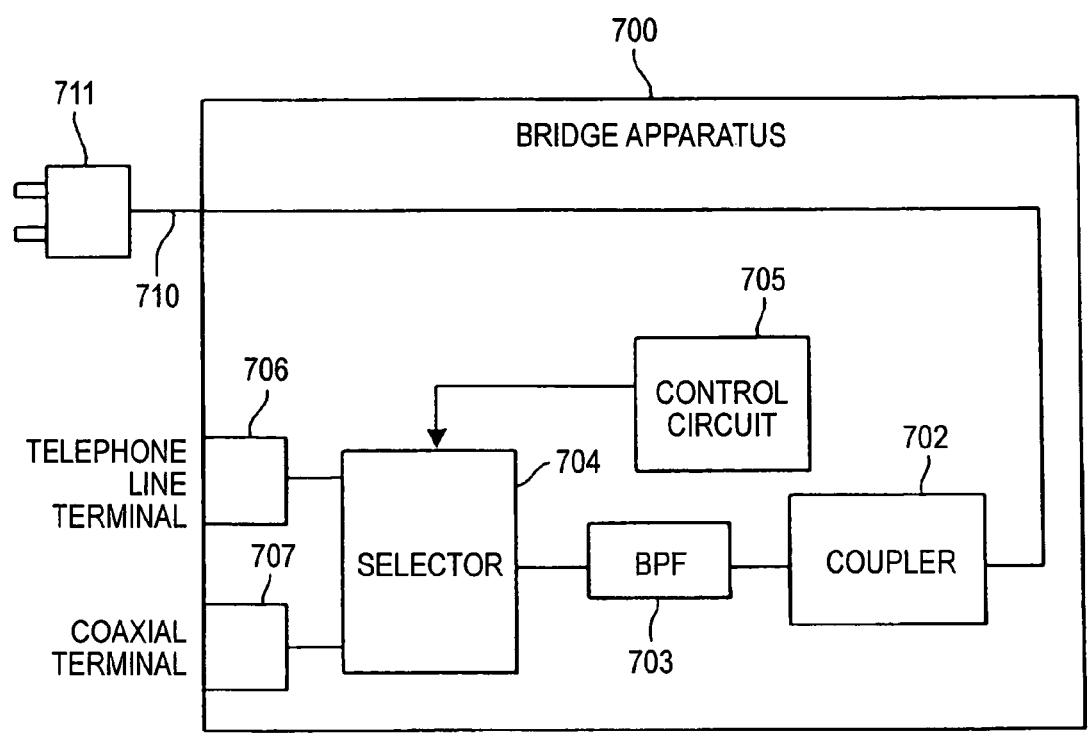
FIG. 14 shows a schematic configuration of a bridge apparatus according to a sixth embodiment.
Figure 22:
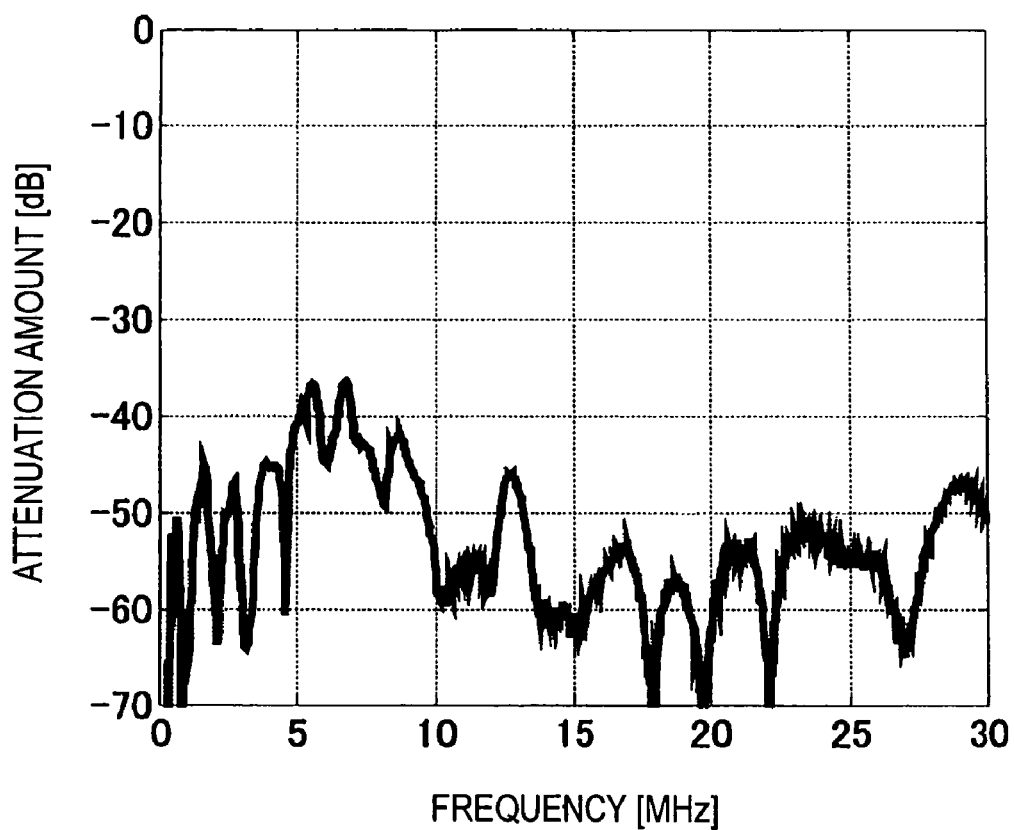
FIG. 22 shows an example of transmission line attenuation characteristics of a power line.
Figure 23:
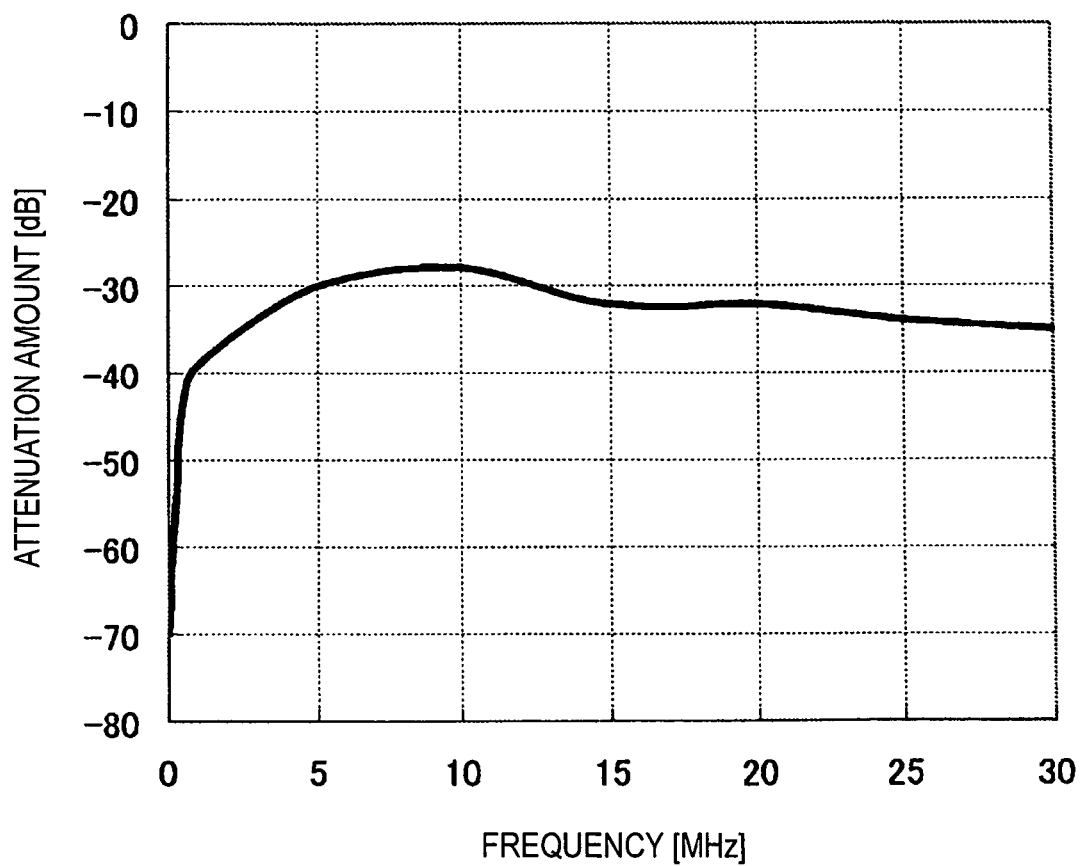
FIG. 23 shows an example of transmission line attenuation characteristics of a TV antenna line.

First, the configuration of the bridge apparatus is described based on FIG. 14. Bridge apparatus 700 connects to power plug 711 (a first power terminal) for connection to an indoor power outlet and to power cord 710. Bridge apparatus 700 includes coupler 702 that separate communication signals from a power line and superimposes such communication signals onto the power line. Here, communication signals refer to analog signals produced by digital modulation. Although the frequency band for the analog signals is 10 kHz or higher, it is preferable that the frequency band be 2 MHz or higher with a small attenuation amount as shown in FIGS. 22 and 23 (described later). Bridge apparatus 700 further includes telephone line terminal (RJ-11) 706 (transmission line terminal, terminal) for connection to a telephone line and coaxial terminal (F terminal) 707 (transmission line terminal, terminal) for connection to a TV antenna line, both of which are configured to connect the power line with other wire transmission lines. Bridge apparatus 700 further includes band pass filter (BPF) 703, selector 704 and control circuit 705. Band pass filter (BPF) 703 prevents noise on the power line outside the communication band from flowing into the other wire transmission lines, i.e., the telephone line and the TV antenna line. Selector 704 selects a terminal from among a plurality of terminals to transmit/receive the communication signals. Control circuit 705 controls the switching of the signal transmission lines by selector 704. Bridge apparatus 700 can also be configured to have the power plug directly installed to the chassis, instead of the power cord, or to have the telephone cord or the antenna cord extending from the chassis, instead of the telephone line terminal and the coaxial terminal. Bridge apparatus 700 can also be provided in an outlet or a wall piping. FIG. 14 does not include a power circuit used by control circuit 705 or the like. As an ordinary electric appliance, this power circuit obtains power from the power line.

Coupler 702 includes a connection transformer. Coupler 702 separates power cord 710, telephone line terminal 706 and coaxial terminal 707, while allowing communication signals to be transmitted among power cord 710, telephone line terminal 706 and coaxial terminal 707. Coupler 702 can also be configured using a photo coupler instead of the connection transformer. Band pass filter 703 includes the same filter as used for a communication bandpass filter provided at a front end of an analog circuit unit of the PLC apparatus (described later). Band pass filter 703 eliminates noise elements for better communication performance. Selector 704 switches connections under the control of control circuit 705, by which coupler 702 and band pass filter 703 are selectively connected to either telephone line terminal 706 or coaxial terminal 707. Selector 704 can connect/disconnect coupler 702 to/from both telephone line terminal 706 and coaxial terminal 707.

Bridge apparatus 700 establishes High Frequency (HF) connection between power cord 710 and one of telephone line terminal 706 and coaxial terminal 707 via coupler 702, enabling wire communications through connection between the power line and another wire transmission line, i.e., the telephone line or the TV antenna line. The "HF connection" refers to a condition in which the power plug and the telephone line terminal are connected to allow the digitally modulated analog signals to be transmitted bi-directionally. This likewise applies in the following description. The user can manually select and switch to the selected wire transmission line by manipulating control circuit 705 and selector 704. This process can also be achieved by providing a detector (not shown in the drawings) that detects the conditions of wire transmission lines, so that a suitable wire transmission line is automatically selected based on the detected conditions (e.g., S/N ratios) of the wire transmission lines.

Figure 15:
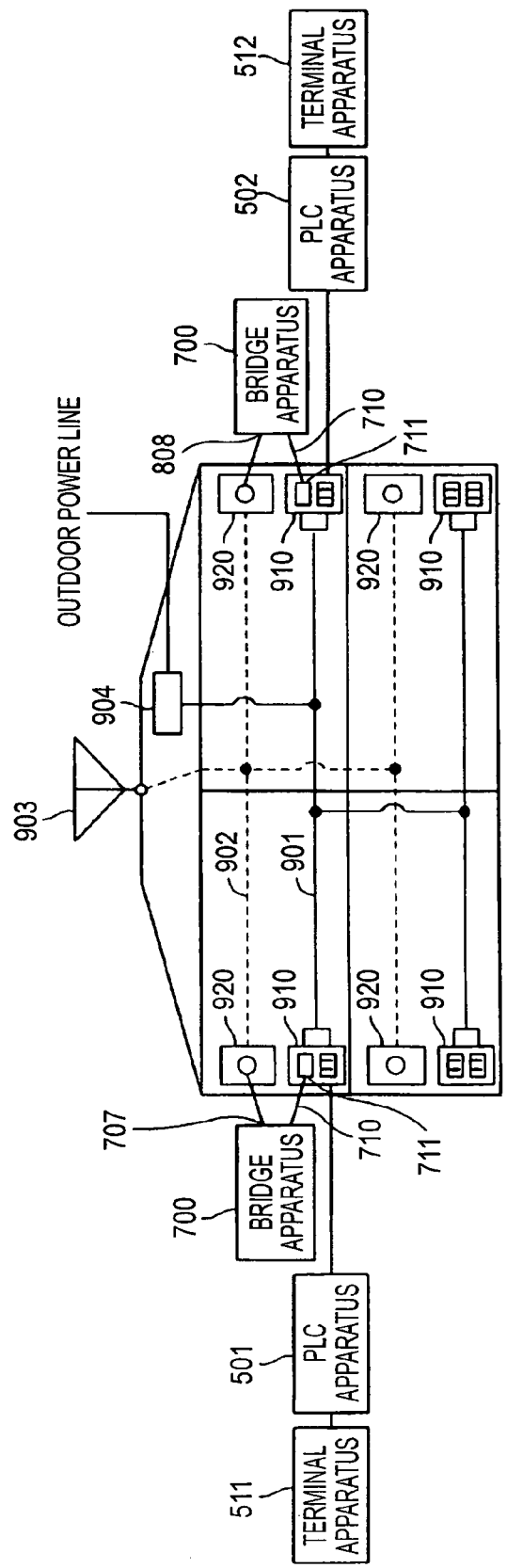
FIG. 15 shows a schematic configuration of a home communication system to which the bridge apparatus according to the six embodiment is applied.
Figure 16:
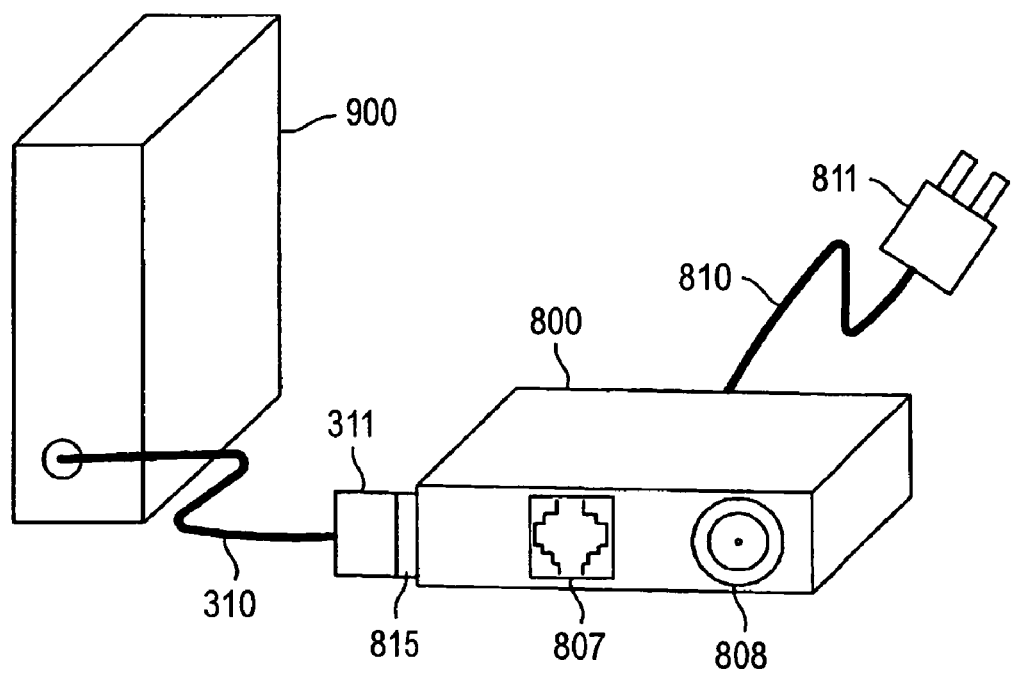
FIG. 16 is a perspective view of an external configuration of a communication adapter and a PLC apparatus connected to the communication adapter according to the six embodiment.

FIG. 15 illustrates a two-story residence with two rooms on each floor, totaling four rooms. The residence is connected to outdoor power lines (lead-in wires). Power lines 901 are wired through the residence from power distribution panel 904 that receives power supply. Power lines 901 connect to power outlets 910, which are installed in each room. Further, TV antenna lines 902 that connect to TV antennas 903 are wired through the residence. TV antenna lines 902 connect to antenna outlets 920, which are installed in each room.

In the example shown in FIG. 15, power outlet 910 and antenna outlet 920 in the left-side room of the second floor and power outlet 910 and antenna outlet 920 in the right-side room of the second floor respectively connect to bridge apparatuses 700, establishing a wire communication system using both power line 901 and TV antenna line 902 as wire transmission lines. PLC apparatuses (PLC modems) 501 and 502 respectively connect to power outlets 910 in the left- and right-side rooms of the second floor. Bridge apparatus 700 can be connected to a telephone outlet (not shown in the drawings), instead of antenna outlet 920, or to both the antenna outlet and the telephone outlet. Terminal apparatus 511 connects to PLC apparatus 501, while terminal apparatus 512 connects to PLC apparatus 502 for individual wire communications.

In the wire communication system with the above-described embodiment, communication signals can be transmitted between power line 901 and TV antenna line 902 via bridge apparatus 700, enabling wire communications using both wire transmission lines. By switching connections at selector 704 in bridge apparatus 700, either power line 901 or TV antenna line 902 is selected to enable communications between terminal apparatuses 511 and 512. For example, when power line 901 and TV antenna line 902 are available for communications, high-speed communications are usually performed via TV antenna line 902 since TV antenna line 902 has favorable wire transmission characteristics including noise. When there are no outlets in the room, or low-speed communications are sufficient, power line 901 is selected for the communications. It is further possible to select the optimum wire transmission line according to the condition of each transmission line. For communications using only power line 901, selector 704 in bridge apparatus 700 terminates connection between coupler 702 and telephone line terminal 706 and between coupler 702 and coaxial terminal 707.

The terminal apparatus includes a data processor that has functions of a communication terminal apparatus, such as a personal computer; peripheral devices, such as a printer and a display; and a home appliance, such as a TV set, a refrigerator, a microwave, a washing machine and an A/C.

The following describes the configuration of the communication adapter. Communication adapter 800 includes power plug 811 (a first power terminal) and power cord 810 for connection to an indoor power outlet, telephone terminal (RJ-11) 807 (transmission line terminal, terminal) for connection to a telephone line, coaxial terminal (F terminal) 808 (transmission line terminal, terminal) for connection to a TV antenna line, and power outlet 815 (a second power terminal) for connection to a different power cord. Connecting power plug 311 of power cord 310 of PLC apparatus 900 to power outlet 815 establishes connection between communication adapter 800 and PLC apparatus 900. Communication adapter 800 can also be configured to have the power plug directly installed to the chassis, instead of the power cord, or to have the telephone cord or the antenna cord extending from the chassis, instead of the telephone line terminal and the coaxial terminal. It is also possible to eliminate the power cord by directly connecting communication adapter 800 and PLC apparatus 900 via a terminal.

Figure 17:
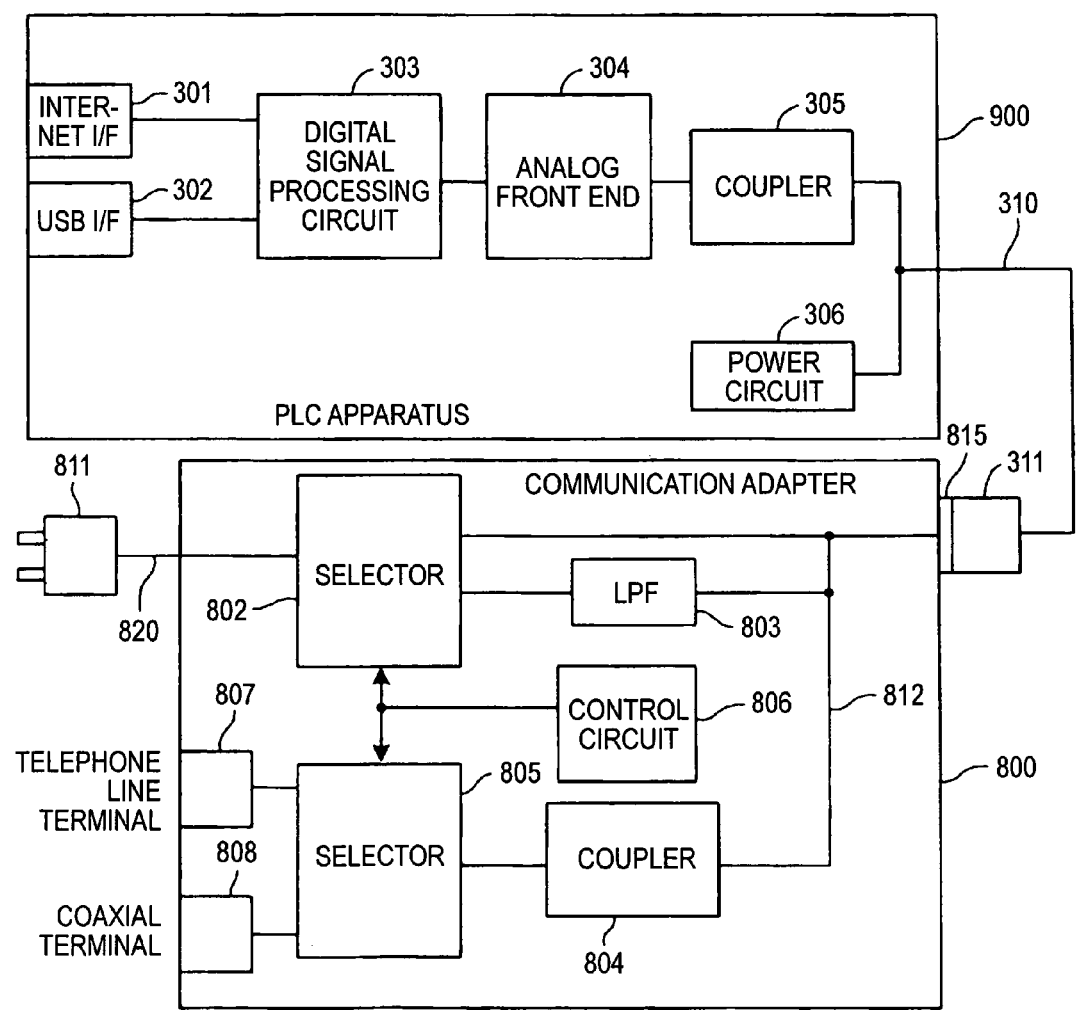
FIG. 17 is a block diagram illustrating a schematic electric configuration of the communication adapter and PLC apparatus according to the six embodiment.

As shown in FIG. 17, communication adapter 800 includes selector 802, low pass filter (LPF) 803, coupler 804, selector 805 and control circuit 806. Selector 802 connected to power cord 820 selects a suitable transmission line for communication signals via the power line. Low pass filter (LPF) 803 blocks communication signals. Coupler 804 separates communication signals from the power line and superimposes the communication signals onto the power line. Selector 805 selects a terminal from among a plurality of terminals to transmit/receive communication signals. Control circuit 806 controls the switching of the signal transmission line by selectors 802 and 805.

Similar to the above-described bridge apparatus 700, coupler 804 includes a connection transformer. Coupler 804 separates power line 812 from telephone line terminal 807 and coaxial terminal 808, while allowing communication signals to be transmitted between power line 812 and telephone line terminal 807 and between power line 812 and coaxial terminal 808. Selector 802 switches connections under the control of control circuit 806, and connects power cord 820 either directly to power outlet 815 or to power outlet 815 via low pass filter 803. Selector 805 switches connections under the control of control circuit 806, and selectively connects coupler 804 to either telephone line terminal 807 or coaxial terminal 808. Selector 805 can connect/disconnect coupler 804 to/from both telephone line terminal 807 and coaxial terminal 808.

Communication adapter 800 establishes High Frequency (HF) connection between power line 812 and telephone line terminal 807 or between power line 812 and coaxial terminal 808 via coupler 804, enabling wire communications through connection between the power line and another wire transmission line, i.e., the telephone line or the TV antenna line. In this example, when connecting coupler 804 to either telephone line terminal 807 or coaxial terminal 808, low pass filter 803 is connected to power cord 820 through selector 802, preventing communication signals from flowing into power cord 820. When coupler 804 is not connected to telephone line terminal 807 and coaxial terminal 808, power cord 820 is directly connected to power line 812, allowing communication signals to be transmitted via power cord 820. The user can manually select and switch to the selected wire transmission line by manipulating control circuit 806 and selectors 802 and 805. The process can also be achieved by providing a detector (not shown in the drawings) that detects the conditions of wire transmission lines, so that a suitable wire transmission line is automatically selected based on the detected conditions (e.g., S/N ratios) of the wire transmission lines.

PLC apparatus 900 includes Ethernet Interface (Ethernet I/F) 301 (RJ-45) for connection to a personal computer or the like via Ethernet (registered mark) and USB (Universal Serial Bus) interface (USB I/F) 302 for connection to a personal computer or the like via a USB. PLC apparatus 900 further includes digital signal processing circuit 303 and analog front end 304. Digital signal processing circuit 303 outputs to analog front end 304 communication signals after modulating of digital signals including transmission data, and extracts communication data received after demodulating of communication signals input from analog front end 304. Analog front end 304 converts transmission communication signals into analog signals and converts received communication signals into digital signals. PLC apparatus 900 further includes power circuit 306 and coupler 305. Power circuit 306 converts AC power supplied via power cord 310 into DC power of predetermined voltage to be supplied to each unit of PLC apparatus 900. Coupler 305 separates analog front end 304 from power circuit 306 and power cord 310, while allowing communication signals to be transmitted between analog front end 304 and power cord 310.

Figure 18:
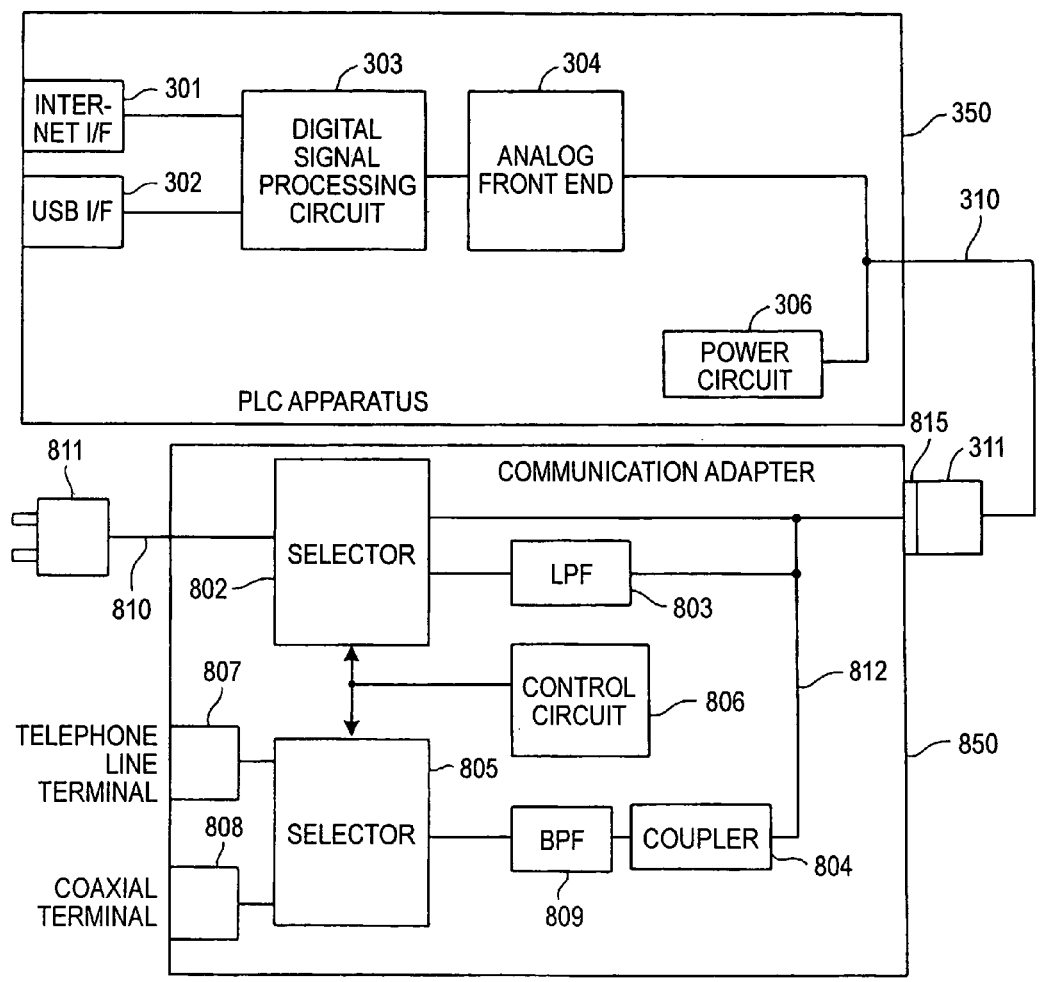
FIG. 18 shows a configuration of a modified example of the communication adapter and PLC apparatus according to the six embodiment.

FIG. 18 shows a configuration of a modified example of the communication adapter and the PLC apparatus. Communication adapter 850 and PLC apparatus 350 include band pass filter 809, instead of couplers 804 and 305 shown in the FIG. 17 configuration, for blocking a frequency band of commercial power supplied to a power line. Same functions can be achieved in this configuration as those in the FIG. 17 configuration. Analog front end 304 includes a band pass filter (not shown in the drawings).

Figure 19:
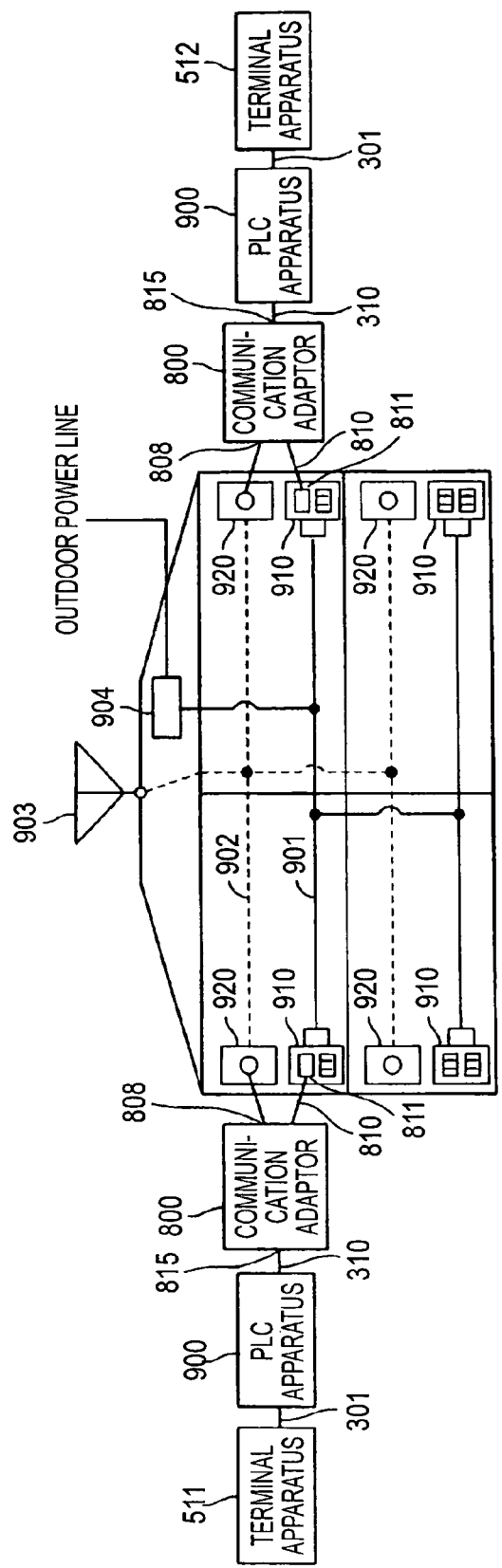
FIG. 19 shows a schematic configuration of a home communication system to which the communication adapter according to the six embodiment is applied.

FIG. 19 shows a schematic configuration of a home communication system to which communication adapter 800 of the present embodiment is applied. Indoor power line 901 and TV antenna line 902 are wired as shown in FIG. 15.

In the example shown in FIG. 19, power outlet 910 and antenna outlet 920 in the left-side room of the second floor and power outlet 910 and antenna outlet 920 in the right-side room of the second floor respectively connect to communication adapters 800. This configuration establishes a wire communication system using both power line 901 and TV antenna line 902. PLC apparatuses 900 respectively connect to communication adapters 800. PLC apparatus 900 can be connected to a telephone outlet (not shown in the drawings) instead of antenna outlet 920. Communication adapter 800 can be connected to a telephone outlet (not shown in the drawings), instead of antenna outlet 920. Communication adapter 800 can also be connected to both antenna outlet 920 and the telephone outlet. Terminal apparatuses 511 and 512 connect to PLC apparatuses 900 for individual wire communications.

In the above-described wire communication system, communication signals can be transmitted between PLC apparatus 900 and TV antenna line 902 via communication adapter 800, enabling wire communications using both wire transmission lines, i.e., power line 901 and antenna line 902. In this example, switching connections at selectors 802 and 805 in communication adapter 800 selects either power line 901 or TV antenna line 902, thereby enabling communications between terminal apparatuses 511 and 512. For instance, when power line 901 and TV antenna line 902 are available for communications, TV antenna line 902 that has favorable transmission characteristics including noise is usually used for high-speed communications, while power line 901 is used when low-speed communications are sufficient. When there are no outlets in the room, power line 901 is used without communication adapter 800 for the communications. It is also possible to select the optimum transmission line, depending on the conditions of the respective transmission lines.

Figure 20:
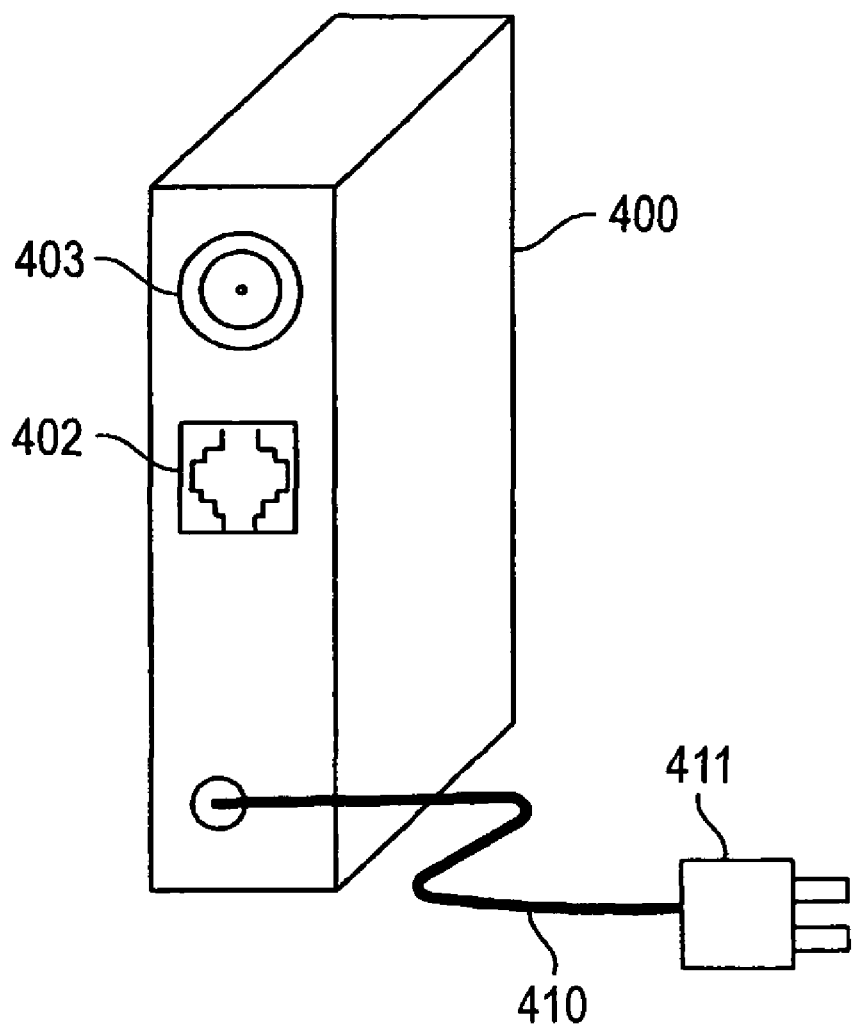
FIG. 20 is a perspective view of an external configuration of the PLC apparatus having functions of the communication adapter according to the six embodiment.

The following describes the configuration of the PLC apparatus integrated with the communication adapter. FIG. 20 is a perspective view of an external configuration of the PLC apparatus having the functions of the communication adapter.

PLC apparatus 400 includes power plug 411 and power cord 410 for connection to an indoor power outlet, telephone line terminal (RJ-11) 402 for connection to a telephone line and coaxial terminal (F terminal) 403 for connection to a TV antenna line. The electric configuration of PLC apparatus 400 integrates the configurations of communication adapter 850 and PLC apparatus 350, eliminating power cord 310 to directly connect the two apparatuses to power line 812.

Figure 21:
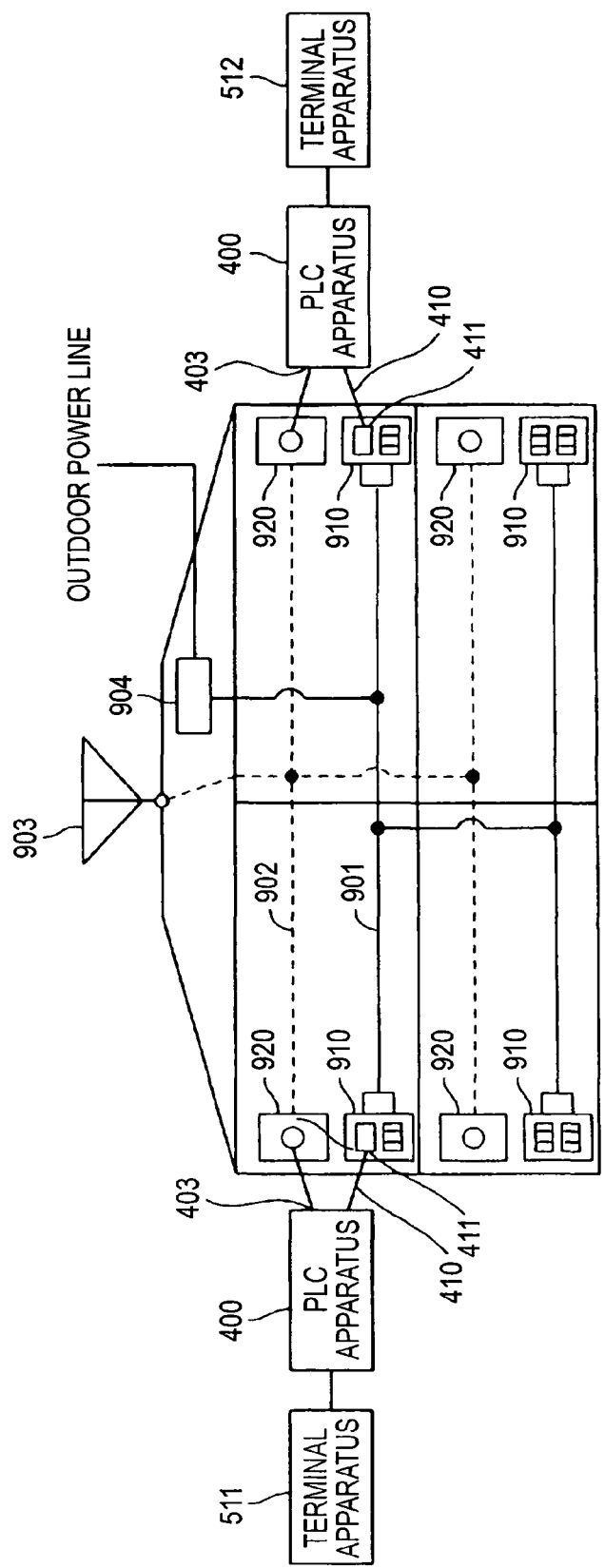
FIG. 21 shows a schematic configuration of a home communication system to which the PLC apparatus according to the six embodiment is applied.

FIG. 21 shows a schematic configuration of a home communication system to which PLC apparatus 400 of the present embodiment is applied. Indoor power line 901 and TV antenna line 902 are wired as shown in FIG. 15.

In the example shown in FIG. 21, power outlet 910 and antenna outlet 920 in the left-side room of the second floor and to power outlet 910 and antenna outlet 920 in the right-side room of the second floor respectively connect to PLC apparatuses 400. This configuration establishes a wire communication system using both power line 901 and TV antenna line 902. PLC apparatus 400 can be connected to a telephone outlet (not shown in the drawings) instead of antenna outlet 920. PLC apparatus 400 can also be connected to both the antenna outlet and the telephone outlet. Terminal apparatuses 511 and 512 connect to PLC apparatuses 400 for individual wire communications.

In the above-described wire communication system, PLC apparatuses 400 allow communication signals to be transmitted between terminal apparatus 511 and power line 901/TV antenna line 902 and between terminal apparatus 512 and power line 901/TV antenna line 902, enabling wire communications using both transmission lines, i.e., power line 901 and TV antenna line 902. In this example, switching connections at the selectors in PLC apparatus 400 selects either power line 901 or TV antenna line 902, thereby enabling communications between terminal apparatuses 511 and 512. For instance, when power line 901 and TV antenna line 902 are available for communications, TV antenna line 902 that has favorable transmission characteristics including noise is usually used for high-speed communications, while power line 901 is used when low-speed communications are sufficient and there are no outlets in the room. It is also possible to select the optimum transmission line, depending on the conditions of the respective transmission lines.

As described above, the bridge apparatus of the present embodiment includes a coupler that separates a power line from other transmission lines according to their power frequency bands and enables signal transmission between the power line and the other transmission lines in the communication bands. By connecting power supplies installed in the room and respective outlets of a telephone line or a TV antenna line, it becomes possible to perform wire communications using the power line and one of the other wire transmission lines, i.e., the telephone line and the TV antenna line, or using the power line and the other two wire transmission lines.

The communication adapter of the present embodiment includes a coupler that has the same configuration as the above-described bridge apparatus, a cord or a terminal that connects to the power line, and a selector that selects a wire transmission line to be connected to the PLC apparatus from among a plurality of wire transmission lines. The communication adapter connects power supplies in the room to respective outlets of a telephone line or a TV antenna line, establishing connection with the PLC apparatus. This configuration enables the PLC apparatus to perform wire communications using the power line and one of the other transmission lines, i.e., the telephone line or the TV antenna line, or using the power line and the other two wire transmission lines.

The above-described embodiments are applied to TV terrestrial broadcasting, using one type of indoor antenna line terminal, i.e., "F terminal". However, when there are a variety of broadcasting types, including not only terrestrial broadcasting but also BS (Broadcasting Satellite) and CS (Communications Satellite), a plurality of types of antenna line terminals is internally provided. In this case, it is possible to use a selector to select the plurality of types of antenna line terminals as wire transmission lines other than a power line, instead of only one antenna line terminal, enabling effective use of the plurality of wires.

Therefore, the bridge apparatus and communication apparatus of the present embodiment enable smooth signal transmission via a more suitable wire transmission line selected based on various conditions, including wire transmission line conditions, wiring configurations, communication apparatus configurations and specifications, communication speed and communication purposes.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention. While the plurality of embodiments is described hereinbefore, it may combine at least two of any embodiment out of the plurality of embodiments.

This application is based on the Japanese Patent Application Nos. 2005-268049 and 2005-112249 filed on Sep. 15, 2005 and Apr. 8, 2005 respectively, entire content of which is expressly incorporated by reference herein.

What is claimed is:

1. A relay apparatus for relaying a communication signal transmitted from a power line communication device, the relay apparatus comprising:
    a first terminal for connecting with a wire transmission line, the wire transmission line for being commonly used as a transmission line of the communication signal transmitted from the power line communication device and of another communication signal transmitted from another device, respective frequency bands of the communication signal and the another signal being different from each other;
    a second terminal for connecting with the power line communication device;
    a third terminal for connecting with a power line;
    a power filter unit including a low pass filter for passing low frequency components, the power filter unit being provided between the second terminal and the third terminal, a first connection line between the second terminal and the third terminal in which the low pass filter is connected between the second terminal and the third terminal and a second connection line between the second terminal and the third terminal in which the low pass filter is disconnected between the second terminal and the third terminal; and
    a band pass filter, provided between the power filter unit and the first terminal, for blocking the another communication signal transmitted from the another device and passing the communication signal transmitted from the power line communication device,
    wherein the power filter unit includes a switch unit for selecting between the first connection line and the second connection line, and
    wherein the switch unit selects the first connection line to cause the impedance characteristic of the power filter unit to be high to prevent the communication signal transmitted from the power line communication device to be relayed between the second terminal and the third terminal while the communication signal is being transmitted between the second terminal and the first terminal and selects the second connection line to cause the impedance characteristic of the power filter unit to be low to enable the communication signal transmitted from the power line communication device to be relayed between the second terminal and the third terminal.

2. The relay apparatus according to claim 1, wherein the switch unit selects the disconnection state when the power line is employed as a transmission line for the communication signal transmitted from the power line communication device.

3. The relay apparatus according to claim 1, further comprising:
    a selector for connecting between the first terminal and the second terminal, wherein the selector controls a transmission line between the first terminal and the second terminal to be in an off state in case that the communication signal transmitted from the power line communication device is relayed between the second terminal and the third terminal.

4. The relay apparatus according to claim 3, further comprising:
    a terminating unit for terminating the transmission line between the first terminal and the second terminal, wherein the selector selects the terminating unit to terminate the transmission line between the first terminal and the second terminal in the case that the communication signal transmitted from the power line communication device is relayed between the second terminal and the third terminal.

5. The relay apparatus according to claim 1, wherein the wire line is a coaxial line.

6. The relay apparatus according to claim 1, wherein the wire line is a telephone line.

* * * * *